United States Patent
Penacho et al.

(10) Patent No.: US 11,600,149 B2
(45) Date of Patent: Mar. 7, 2023

(54) SYSTEMS AND METHODS FOR PROVIDING A FEATURE GAME

(71) Applicant: ARISTOCRAT TECHNOLOGIES AUSTRALIA PTY LIMITED, North Ryde (AU)

(72) Inventors: Gary Penacho, Henderson, NV (US); Thomas Tuomey, Las Vegas, NV (US); Allon Englman, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 263 days.

(21) Appl. No.: 17/094,568

(22) Filed: Nov. 10, 2020

(65) Prior Publication Data

US 2021/0065520 A1  Mar. 4, 2021

Related U.S. Application Data

(63) Continuation of application No. 16/557,178, filed on Aug. 30, 2019, now Pat. No. 10,867,483.

(51) Int. Cl.
 *G07F 17/00* (2006.01)
 *G07F 17/34* (2006.01)
 *G07F 17/32* (2006.01)

(52) U.S. Cl.
 CPC .......... *G07F 17/34* (2013.01); *G07F 17/3209* (2013.01); *G07F 17/3213* (2013.01); *G07F 17/3244* (2013.01); *G07F 17/3267* (2013.01); *G07F 17/3258* (2013.01)

(58) Field of Classification Search
 None
 See application file for complete search history.

(56) References Cited

U.S. PATENT DOCUMENTS

| 6,203,428 B1 | 3/2001 | Giobbi |
| D445,841 S | 7/2001 | Sabo |
| 6,659,867 B1 * | 12/2003 | Kodachi ................. G07F 17/34 463/16 |

(Continued)

OTHER PUBLICATIONS

Office Action dated Feb. 25, 2021 for U.S. Appl. No. 29/702,721 (pp. 1-9).

(Continued)

*Primary Examiner* — Paul A D'Agostino
(74) *Attorney, Agent, or Firm* — Armstrong Teasdale LLP

(57) ABSTRACT

An electronic gaming machine includes a display device, a player input interface configured to receive player input from a player; and a game controller configured to execute instructions. The instructions cause the processor to generate, based on a random number generator, at least one random number, query a lookup table of display symbols to be displayed in a grouped symbol position on the display device. At least one entry in the lookup table is associated with a plurality of single symbol positions and a weight, wherein the plurality of single symbol positions includes a population of partial symbols. A grouped symbol is displayed having a height at least two times the height of a single symbol position and comprising at least two of the partial symbols, the two partial symbols combining to display a complete symbol having a height at least two times the height of a single symbol position.

20 Claims, 17 Drawing Sheets

(56) References Cited

U.S. PATENT DOCUMENTS

| | | | |
|---|---|---|---|
| D593,116 S | 5/2009 | Garcia | |
| D638,842 S | 5/2011 | Woods | |
| 8,096,869 B2* | 1/2012 | Yoshimi | G07F 17/3213 463/16 |
| 8,382,570 B2 | 2/2013 | Bennett | |
| D682,296 S | 5/2013 | Dijulio | |
| D686,635 S | 7/2013 | Cranfill | |
| D697,925 S | 1/2014 | Woo-Seok | |
| D698,796 S | 2/2014 | Evans | |
| 8,795,059 B2 | 8/2014 | Aoki | |
| D718,780 S | 12/2014 | Rajaraman | |
| 8,902,179 B1 | 12/2014 | Ota | |
| D733,725 S | 7/2015 | Seo | |
| 9,224,270 B2* | 12/2015 | Lee | G07F 17/3267 |
| D748,669 S | 2/2016 | Vonshak | |
| D749,604 S | 2/2016 | Trousdell | |
| D754,682 S | 4/2016 | Lee | |
| D757,041 S | 5/2016 | Zankowski | |
| D762,686 S | 8/2016 | Lee | |
| D762,711 S | 8/2016 | Zhang | |
| D772,253 S | 11/2016 | Sugawara | |
| D781,299 S | 3/2017 | Yun | |
| D786,907 S | 5/2017 | Alonso Ruiz | |
| D789,948 S | 6/2017 | Sun | |
| D802,010 S | 11/2017 | Blyde | |
| D813,263 S | 3/2018 | Hwang | |
| D829,240 S | 9/2018 | Rowny | |
| 10,176,668 B2 | 1/2019 | Galasso | |
| 10,217,313 B2 | 2/2019 | Saunders | |
| D844,019 S | 3/2019 | Keys | |
| D847,828 S | 5/2019 | Kim | |
| D850,481 S | 6/2019 | Huh | |
| D857,749 S | 8/2019 | Brinker | |
| D872,127 S | 1/2020 | Alonso Ruiz | |
| D875,115 S | 2/2020 | Yan | |
| D881,223 S | 4/2020 | Tuomey | |
| 10,867,483 B1 | 12/2020 | Penacho | |
| D918,237 S | 5/2021 | Lee | |
| D942,466 S | 2/2022 | Degens | |
| D942,491 S | 2/2022 | Anzures | |
| D946,587 S | 3/2022 | Pierer | |
| D947,870 S | 4/2022 | Zimmerman | |
| D954,093 S | 6/2022 | Knittel | |
| D956,772 S | 7/2022 | Kim | |
| D956,798 S | 7/2022 | Ban | |
| D963,694 S | 9/2022 | Xu | |
| 2007/0298862 A1* | 12/2007 | Kidneigh | G07F 17/323 463/20 |
| 2008/0032782 A1 | 2/2008 | Boesen | |
| 2008/0058083 A1* | 3/2008 | Saito | G07F 17/34 463/20 |
| 2009/0305765 A1* | 12/2009 | Walker | G07F 17/34 463/43 |
| 2012/0036220 A1 | 2/2012 | Dare | |
| 2012/0036552 A1 | 2/2012 | Dare | |
| 2012/0220358 A1* | 8/2012 | Nakamura | G07F 17/3244 463/20 |
| 2013/0029747 A1* | 1/2013 | Kelly | G07F 17/3209 463/20 |
| 2013/0102375 A1* | 4/2013 | Aoki | G07F 17/32 463/20 |
| 2013/0316818 A1* | 11/2013 | Earley | G07F 17/3211 463/31 |
| 2014/0018147 A1* | 1/2014 | Gobe | G07F 17/34 463/20 |
| 2014/0051496 A1 | 2/2014 | Meyer | |
| 2014/0141860 A1 | 5/2014 | Meyer | |
| 2014/0179402 A1* | 6/2014 | Delekta | G07F 17/3262 463/20 |
| 2014/0200692 A1* | 7/2014 | Thurman | G09B 19/0038 700/91 |
| 2014/0274288 A1* | 9/2014 | Hornik | G07F 17/326 463/20 |
| 2014/0298269 A1* | 10/2014 | Underkoffler | G06F 3/011 715/848 |
| 2015/0011291 A1* | 1/2015 | Nauman | G07F 17/34 463/20 |
| 2015/0080106 A1* | 3/2015 | Nauman | G07F 17/326 463/20 |
| 2015/0170461 A1* | 6/2015 | Berman | G07F 17/3213 463/20 |
| 2015/0193036 A1 | 7/2015 | Yoo | |
| 2015/0206382 A1* | 7/2015 | Itagaki | G07F 17/3213 463/20 |
| 2015/0228163 A1 | 8/2015 | Clarebrough | |
| 2015/0379809 A1* | 12/2015 | Clarebrough | G07F 17/3227 463/20 |
| 2016/0093172 A1* | 3/2016 | Kitamura | G07F 17/34 463/17 |
| 2016/0314644 A1 | 10/2016 | Meyer | |
| 2016/0314661 A1* | 10/2016 | Vann | G07F 17/3288 |
| 2017/0024956 A1* | 1/2017 | Hornik | G07F 17/3213 |
| 2017/0032611 A1* | 2/2017 | Luong | G07F 17/3258 |
| 2017/0046913 A1 | 2/2017 | Fong | |
| 2017/0092041 A1* | 3/2017 | Kudo | G07F 17/3267 |
| 2017/0092046 A1* | 3/2017 | Hendricks | G07F 17/3246 |
| 2017/0228127 A1 | 8/2017 | Mukherjee | |
| 2017/0236383 A1* | 8/2017 | Nakamura | G07F 17/3213 463/20 |
| 2018/0033253 A1* | 2/2018 | Vann | G07F 17/3246 |
| 2018/0061186 A1 | 3/2018 | Berman | |
| 2018/0165913 A1* | 6/2018 | Ito | G07F 17/326 |
| 2018/0218564 A1* | 8/2018 | Elmqvist | G07F 17/34 |
| 2018/0268015 A1* | 9/2018 | Sugaberry | G06N 3/049 |
| 2018/0321045 A1* | 11/2018 | Belt | A61H 3/061 |
| 2019/0130704 A1 | 5/2019 | Cormack | |
| 2019/0139372 A1 | 5/2019 | Berman | |
| 2019/0304255 A1 | 10/2019 | San | |

OTHER PUBLICATIONS

"Play 7,400+ Free Slot Machine Games Online" Feb. 2, 2019, posted at slotu.com, [site visited Feb. 22, 2021]. https://web.archive.org/web/20190202142051/https://slotu.com (Year: 2019).

Heaton, Carl, "How to Prototype a Webpage Design in an Easy and Inexpensive Way" Mar. 14, 2012, posted at webcoursesbangkok.com, [site visited Feb. 22, 2021]. https://web.archive.org/web/20180725081543/https://www.webcoursesbangkok.com/blog/prototype-web-design (Year: 2012).

Notice of Allowance dated May 4, 2021 for U.S. Appl. No. 29/702,721 (pp. 1-6).

Notice of Allowance dated Aug. 13, 2020 for U.S. Appl. No. 16/557,178 (pp. 1-8).

Office Action dated May 11, 2022 for U.S. Appl. No. 29/701,488 (pp. 1-11).

Game of Thrones: Winter is Here, Slot Machine Preview G2E 2019 (#G2E2019) Aristocrat, by RandomSlots, YouTube [online], published on Oct. 24, 2019, [retrieved on May 6, 2022], retrieved from the Internet <URL: https://www.youtube.com/watch?v=jolMihs5-wl> (Year: 2019).

Office Action dated Jul. 12, 2022 for U.S. Appl. No. 29/701,488 (pp. 1-2).

Notice of Allowance dated Jul. 13, 2022 for U.S. Appl. No. 29/787,020 (pp. 1-8).

"Free Aristocrat Slot Machines" Jun. 29, 2019, posted at slotu.com, [site visited Jun. 28, 2022]. https://web.archive.org/web/20190629161253/https://slotu.com/free-aristocrat-slots-online (Year: 2019).

Notice of Allowance dated Oct. 7, 2022 for U.S. Appl. No. 29/701,488 (pp. 1-6).

* cited by examiner

SYSTEMS AND METHODS FOR PROVIDING A FEATURE GAME

CROSS REFERENCE TO RELATED APPLICATIONS

The present application is a continuation of, and claims priority to, U.S. patent application Ser. No. 16/557,178, filed Aug. 30, 2019, entitled "SYSTEMS AND METHODS FOR PROVIDING A FEATURE GAME", which is related to U.S. patent application Ser. No. 29/701,488, filed Aug. 12, 2019, entitled "DISPLAY SCREEN OR PORTION THEREOF WITH A TRANSITIONAL GAMING MACHINE INTERFACE," and U.S. patent application Ser. No. 29/702,721 filed Aug. 21, 2019, entitled "DISPLAY SCREEN OR PORTION THEREOF WITH A GAMING MACHINE INTERFACE," the disclosures of which are hereby incorporated by reference in their entireties.

TECHNICAL FIELD

The field of disclosure relates generally to electronic gaming, and more particularly, to systems and methods for providing a feature game on an electronic gaming device.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol display positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

BRIEF DESCRIPTION

In one aspect, an electronic gaming machine is provided. The electronic gaming device includes at least one display device, a player input interface configured to receive player input from a player, a credit input device configured to receive a credit wager, and a game controller configured to execute instructions stored in a tangible, non-transitory, computer-readable storage medium, which, when executed by the game controller, cause the game controller to determine, during a base game initiated in response to receiving the credit wager, that a feature game trigger condition is satisfied. The instructions also cause the game controller to activate, in response to the feature game trigger condition, a feature game within the base game, the feature game including a plurality of feature game reels. The instructions further cause the game controller to display, on the at least one display device and in response to activating the feature game, the plurality of feature game reels, a prize position area positioned above the plurality of feature game reels, and a credit stack positioned above the prize position area, the credit stack includes credit prizes potentially available to be won by the player. The instructions also cause the game controller to automatically move at least one credit prize from the credit stack into the prize position area. The instructions further cause the game controller to generate a first game outcome based on a random number generator to display one or more symbols for each of the plurality of reels. The instructions also cause the game controller to determine that at least one of the displayed symbols for the first game outcome is a winning symbol. The instructions further cause the game controller to provide the at least one credit prize in response to the determining. The instructions also cause the game controller to increase a multiplier by a predetermined amount based on the determining. The instructions further cause the game controller to display, on the at least one display device, the multiplier as an applicable multiplier for a subsequent credit prize won during a subsequent spin.

In another aspect, a non-transitory computer-readable media containing instructions embodied thereon is provided. When executed by a processor, the instructions cause the processor to cause to be displayed, on at least one display device of an electronic gaming device and in response to activating a feature game, a plurality of feature game reels, a prize position area positioned above the plurality of feature game reels, and a credit stack positioned above the prize position area. The credit stack includes credit prizes potentially available to be won by the player. The instructions also cause the processor to generate a first game outcome based on a random number generator to display one or more symbols for each of the plurality of reels. The instructions further cause the processor to determine that at least one of the displayed symbols for the first game outcome is a prize symbol. The instructions also cause the processor to provide the at least one credit prize in response to the determining. The instructions further cause the processor to increase a multiplier by a predetermined amount based on the determining. The instructions also cause the processor to cause to be displayed, on the at least one display, the multiplier as an applicable multiplier for a subsequent credit prize won during a subsequent spin.

In yet another aspect, a method of electronic gaming implemented on an electronic gaming machine is provided. The electronic gaming machine includes at least one display device, a player input interface, a game controller, and a credit input mechanism. The method includes displaying, on the at least one display device and in response to activating the feature game, the plurality of feature game reels, a prize position area positioned above the plurality of feature game reels, and a credit stack positioned above the prize position area. The credit stack includes credit prizes potentially available to be won by the player. The method also includes animating, on the at least one display device, moving a first row of credit prizes from the credit stack into the prize position area. The method further includes displaying one or more reel spins that land on a symbol for each of the plurality of reels. The method also includes presenting, on the at least one display device, that at least one credit prize from the first row of credit prizes has been awarded for one or more reels that land on a winning symbol. The method further includes animating, on the at least one display device, moving a second row of credit prizes from the credit stack into the position area. The method also includes increasing a multiplier by a predetermined amount based on the determining. The method further includes display, on the display, the multiplier as an applicable multiplier for a subsequent credit prize won during a subsequent spin.

BRIEF DESCRIPTION OF THE DRAWINGS

An example embodiment of the subject matter disclosed will now be described with reference to the accompanying drawings.

DETAILED DESCRIPTION

Figure 1:
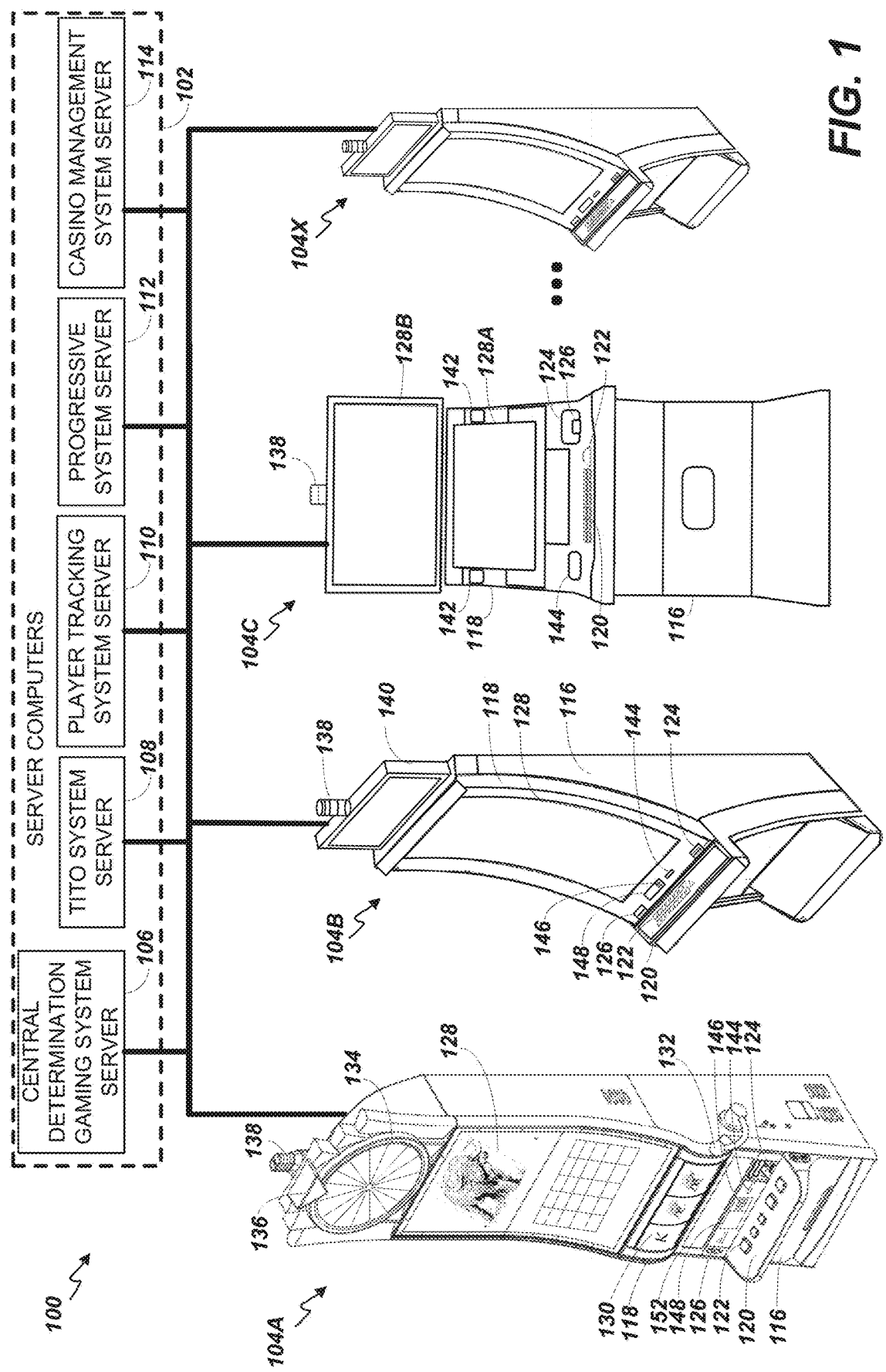
FIG. 1 is a schematic diagram of a plurality of electronic gaming devices (EGMs) networked with various gaming-related servers.

Embodiments of the present disclosure provide systems and methods for providing bonus features of a base game as well as providing a feature game triggered within the base game. An electronic gaming machine provides a base game with several bonus features that may be triggered within the base game. The electronic gaming machine is also configured to present a feature game in response to a feature game trigger condition. The feature game may be activated when a certain number of feature game symbols (e.g., scatter symbols) are displayed on a game play area during play of the base game. In response to activating the feature game, the electronic gaming machine displays a plurality of feature game reels, a credit stack, and a prize position area above the feature game reels. In an effort to enhance the experience of players, game designers often seek to develop more complex wagering games that offer new game mechanics. As wagering games become more complex, technical problems arise. One technical problem with more complex wagering games is controlling the return to player (RTP). Another technical problem includes controlling volatility of games.

The present disclosure describes an electronic gaming machine that provides a technical solution to at least these problems. In one example, a feature game is provided that can provide control of RTP and volatility for operators. The feature game includes three feature game reels, with each reel displaying a single symbol display position. Each of the three feature game reels, in an example embodiment, includes only prize symbols and blank spaces on the three feature game reels. Above each reel is a prize position area for that reel, as well as a credit stack above the prize position area. In an example embodiment, the credit stack above the prize position area includes seven credit prizes arranged in ascending credit value, thereby defining seven prize tiers. When the feature game is triggered, the electronic gaming machine removes the base game contents and displays the feature game, giving the player five free spins in the feature game. Before the first free spin, one credit prize from each of the credit stacks shifts down into the prize position area above each reel. Upon spinning the feature game reels, each reel lands on either a prize symbol or a blank. Whenever a prize symbol appears on a reel, the credit prize appearing above that reel is awarded to the player. As such, in each spin, the player has a chance to win any of the three credit prizes above each of the reels.

In addition, in the example embodiment, each reel may also have a multiplier associated with that reel. Any credit prizes awarded for that wheel are multiplied by the multiplier for that reel. Each of the multipliers begin at a base value of a times one ("×1") multiplier. Whenever a prize symbol appears on a reel, the multiplier is advanced (e.g., increased in value by one or more). As the multiplier(s) increase, the multiplier is displayed near the reel to inform the player of the presence of the multiplier, thereby heightening excitement in the game. Further, whenever the reel does not land on a prize symbol (e.g., lands on a blank), the multiplier for that reel is reset to the base value (e.g., to "×1"). As such, the multiplier for a given reel may continue to increase in value as long as the reel continues to land on prize symbols, but resets once the prize symbol is not achieved.

To control RTP and volatility in the feature game, the feature game provides various components used to provide the feature game. First, the feature game assigns fixed low-end values to the prizes within the first two prize tiers and a fixed top-end value to the prizes within the top (e.g., seventh) prize tier. For the third through sixth tiers, the feature game determines the prize values from a limited set of options (e.g., two to ten credit values ranging between the second tier prize values and the top tier prize value). For each possible prize value, the feature game provides a pre-configured, lookup table with weights ("prize tier table") that is configured to control RTP and volatility. During game play, the feature game sets the fixed first, second, and seventh prize tiers, but selects the prize values for each of the third through sixth tiers (e.g., randomly, based on a weighted RNG result, sorted lowest to highest). The prize tier tables used for the first, fourth, and seventh tier are used consistently for those tiers, as the prize values for those tiers are fixed. For the third through sixth tiers, those prize values may change between feature game instances, so selection of which lookup table to use for each prize tier may also change. Each prize tier table is pre-configured to control RTP for that tier based on, for example, the award value for that lookup table, the chances of the player progressing to that round, the chances of having each particular multiplier applied to the award value for that lookup table, or such. Further, the feature game is configured to control volatility by configuring the early, fixed small prize tier tables (e.g., the first and second tiers) to award lesser amounts more frequently, and shifting to higher award amounts less frequently in higher tiers. The potential multipliers, when considered during configuration of the prize tier tables, can be configured such as to increase volatility of the game. As such, the prize tier tables enable control of both RTP and volatility for the feature game.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
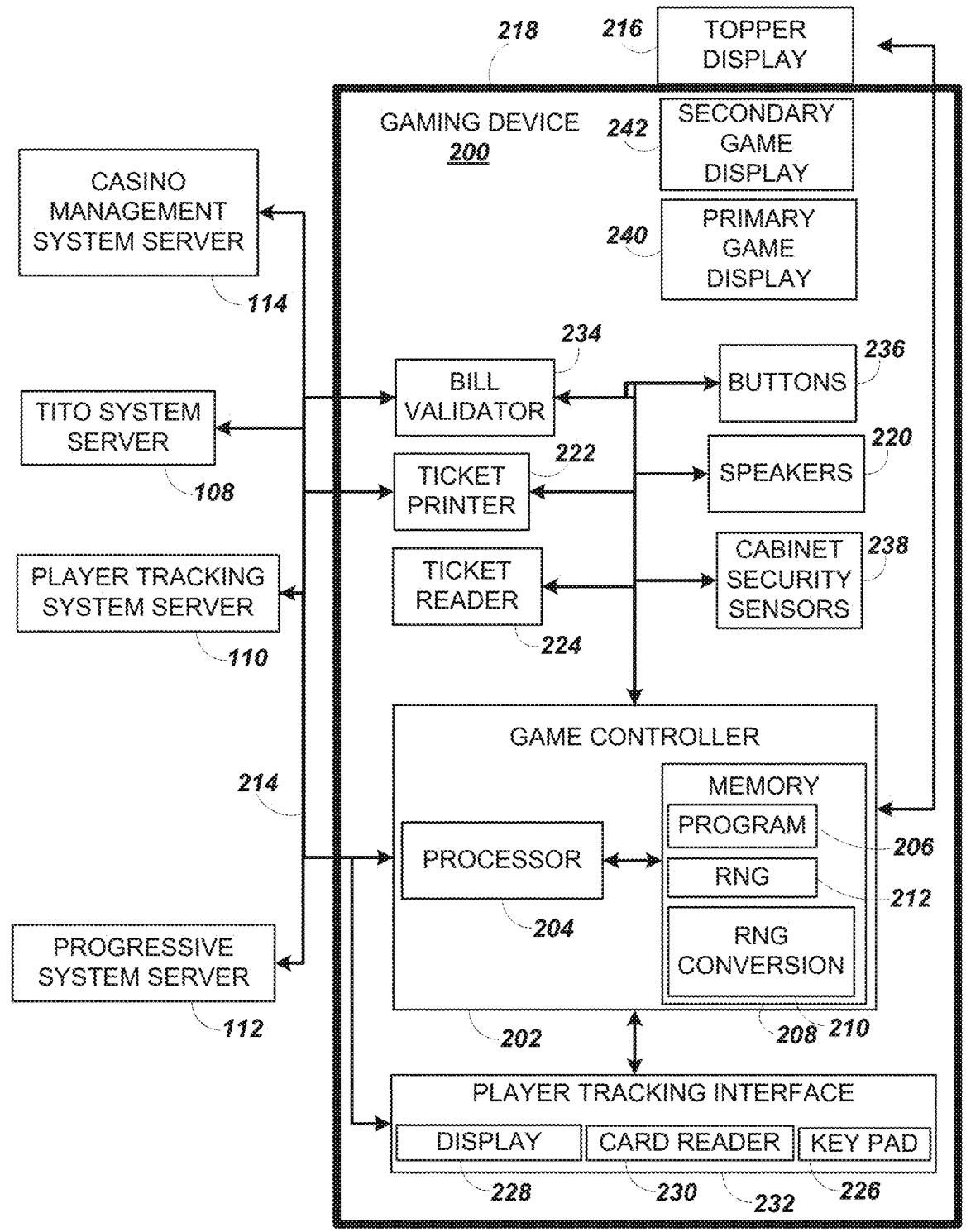
FIG. 2 is a block diagram of an example EGM that includes a plurality of lighting controllers.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and non-volatile memory and other types of non-transitory data storage components. Volatile memory is memory that do not retain data values upon loss of power. Non-volatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game rounds based on instructions and/or data that gaming device 200 exchange with one or more remote gaming devices, such as a central determination gaming system server 106 (not shown in FIG. 2 but shown in FIG. 1). With regard to primary games played on the gaming device 200, the term "game round" refers to a play or a round of a game that gaming device 200 presents (e.g., via a user interface (UI)) to a player (e.g., the game play occurring after submission of a single wager). The game round is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

In some jurisdictions, one regulatory requirement for games running on gaming device 200 may include complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes a random number generator (RNG) 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 may include ensuring a certain level of return to player (RTP). Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on rounds of the game and to receive credit awards based on the outcome of winning rounds. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game round, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
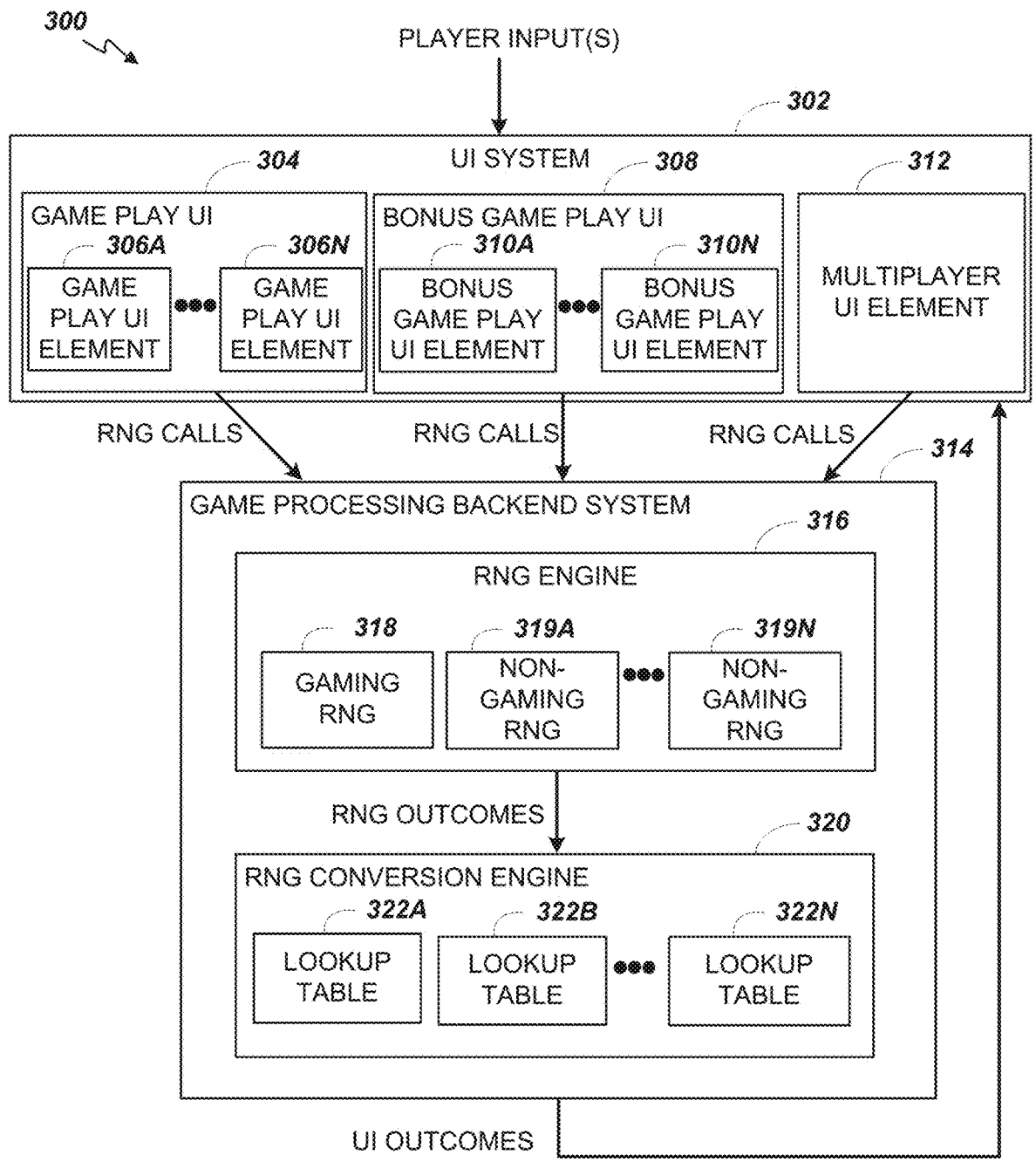
FIG. 3 illustrates, in block diagram form, an embodiment of a game processing architecture that implements a game processing pipeline for the play of a game in accordance with some embodiments described herein.

FIG. 3 illustrates, in block diagram form, an embodiment of a game processing architecture 300 that implements a game processing pipeline for the play of a game in accordance with some embodiments described herein. In the example embodiment, the game processing architecture 300 may be provided on the gaming devices 104, 200 (e.g., by game controller 202). As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 304, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts.

Different lookup tables could be utilized depending on the different game modes. For example, a base game may be associated with one or more base game tables. In addition, bonus features associated with bonus symbols may be associated with one or more bonus feature tables. For example, as described below, if the display of a certain bonus symbol triggers the addition of extra symbol display positions, a lookup table associated with this particular bonus feature may be referenced to determine how to populate the remaining symbol display positions (e.g., to prevent having too many or too little of the same symbols on a play area). Further, feature game events of a feature game may also be associated with a feature game lookup table. For example, a feature game lookup table may be referenced to determine the arrangement of a credit stack as described below. A feature game lookup table may be referenced to identify how many credit prizes to display in the credit stack, and to determine not only the value of each credit prize, but also the location of each credit prize within the credit stack for each round of gameplay.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Throughout this specification and in the claims, the terms "primary game" and "bonus game" refer to a game session that includes more than one game event or, simply, one or more games. The primary game may correspond to a primary or "base" game, as opposed to a bonus game, as described below. The primary game may be initiated in response to a wager or credit being received by or transferred to gaming machine 104A (shown in FIG. 1). The primary game (as well as one or more games comprising the primary game) may also be initiated by other game events including, for example, a player selecting a "spin" button, a start button, a deal button, or any other such input selector designated for initiating a game session. The primary game may be terminated voluntarily in response to an input by the player indicating that the player wishes to stop the game or automatically by the gaming device in response to a termination event, such as a zero credit balance in the reel game.

Further, as used herein, the terms "bonus game," "feature game," "secondary game," and "bonus game session" refer generally to a game or a component of a game involving procedures in addition to the primary game. The feature game may be initiated during play of the primary game and in response to a particular condition occurring during the primary game (e.g., a trigger condition). The feature game may include a plurality of feature game events. For example, where the primary game includes a slot machine game, the feature game may allow players a possibility of winning more than the pay table for the primary game indicates. Typically, a feature game outcome may depend upon a particular symbol being displayed when one of a plurality of final game events takes place. In some embodiments, the outcome of the feature game may be unrelated to the outcome of the primary game.

In one example embodiment, a feature game with cascading credit stacks is provided. The feature game provides an alternate set of reels ("feature game reels") that are comprised of prize symbols and blanks. Above each of the reels appears a cascading stack of credit prizes that may be won by the player during play of the feature game. At each spin of the feature game, the lowest credit prize for each of the credit stacks shifts down to appear as a winnable credit prize above each of the feature game reels. Upon each spin, if a prize symbol appears on a feature game reel, then the player is awarded the credit prize above that reel. Further, the awarded credit prize may be multiplied by a multiplier associated with that reel.

Figure 4:
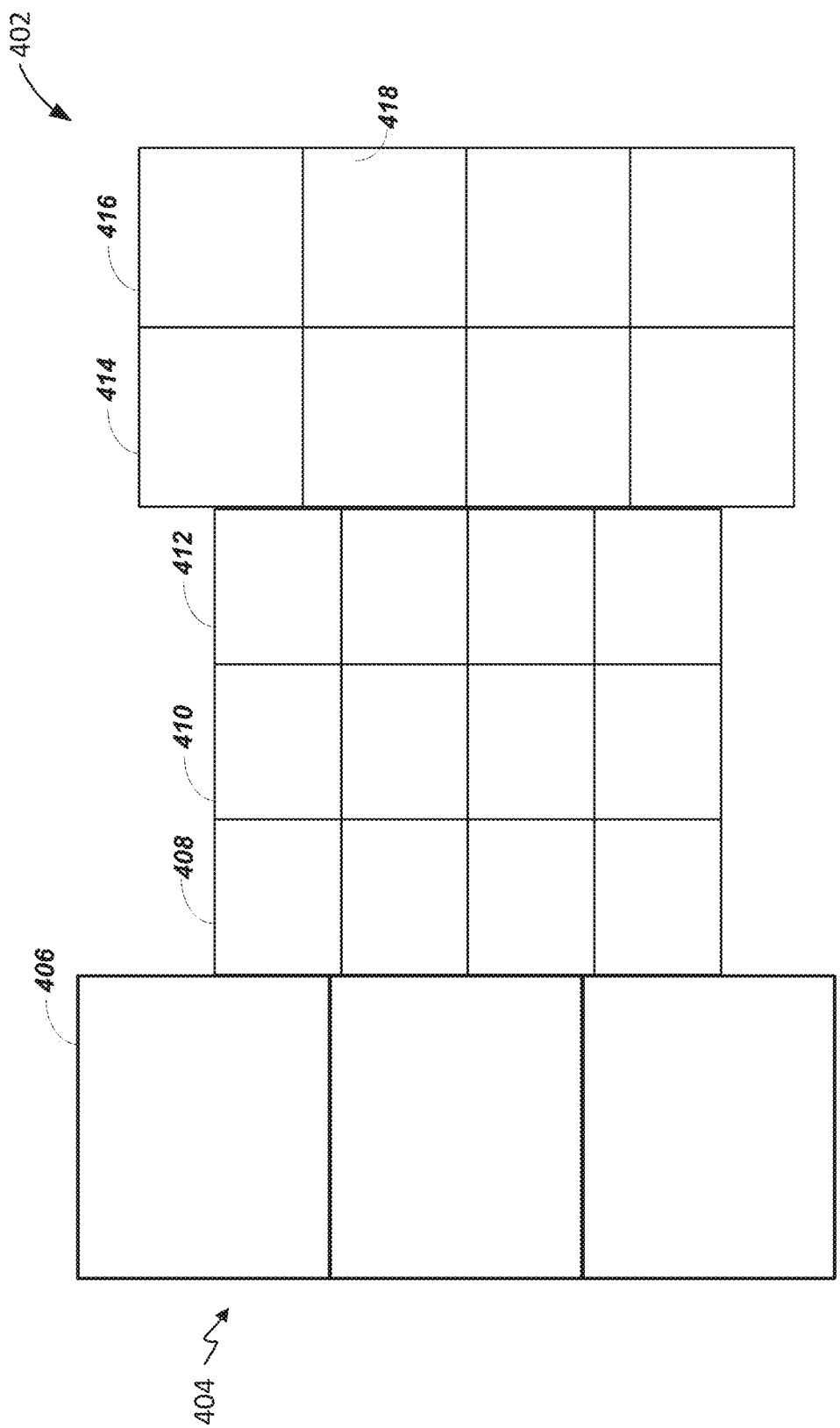
FIG. 4 is a diagram illustrating an initial configuration of a play area of an example base game.

FIG. 4 illustrates an empty play area 402 for an example reel-based base game provided by the gaming device 200 of FIG. 2 using the game processing architecture 300 of FIG. 3. In the example embodiment, the play area 402 that includes a plurality of reels 404 that may spin and stop (e.g., with physical reels) or may be simulated to spin and stop (e.g., with virtual reels) in response to a player submitting a wager and initiating the base game. In some embodiments, play area 402 may be presented by one or more EGMs 104A-104X (shown in FIG. 1) or the gaming device 200 (shown in FIG. 2) when a player initiates play of the base game.

In the example embodiment, reels 404 include a first reel 406, a second reel 408, a third reel 410, a fourth reel 412, a fifth reel 414, and a sixth reel 416. However, any suitable number of reels, such as one reel to reels numbering greater than six reels, may be implemented on a variety of embodiments. Each reel 404 includes a plurality of symbol display positions 418 which, together, define a matrix of symbol display positions (e.g., represented as play area 402). Further, each reel 404 is configured to display a certain number of symbols. Each symbol display position of each reel 404 may also include a symbol. In some embodiments, a single symbol may span multiple symbol display positions, as explained in detail below.

Reels 404 may include simulated or "virtual" reels generated and displayed by one or more processors 204 (such as processors of game controller 202) on any game display, such as primary game display 240, secondary game display 242, topper display 216, player tracking interface display 228, and/or any other suitable display device. In other embodiments, reels 404 may include one or more physical reels (e.g., mechanical reels controlled by stepper motors) having a display element, such as a liquid crystal display (LCD), capable of displaying one or more symbols during gameplay. In other embodiments, reels 404 may include a plurality of mechanical reels overlaid by an LCD panel.

In FIG. 4, all of the symbol display positions are vacant for purposes of illustrating various dimensions of reels 404 and symbol display positions 418 of play area 402. In the example embodiment, first reel 406 is an oversized reel having relatively larger dimensions (e.g., width and height). First reel 406 includes three oversized symbol display positions. First reel 406 is also configured to display symbols that cover one symbol display position, two symbol display positions, and three symbol display positions (e.g., with single, large symbols, as shown and described below).

In the example embodiment, second reel 408, third reel 410, and fourth reel 412 each include four symbol display positions, and each have similar dimensions. The symbol display positions for reels 408-412 likewise have similar dimensions with respect to one another. In the example embodiment, each of second reel 408, third reel 410, and fourth reel 412 are configured to display symbols in each symbol display position. In some embodiments, reels 408-412 may display symbols covering two symbol display positions.

In the example embodiment, fifth reel 414 and sixth reel 416 of play area 402 have similar dimensions. Fifth reel 414 and sixth reel 416 are bigger than reels 408-412 and smaller than first reel 406, and with proportionally sized symbol display positions. In some embodiments, fifth reel 414 and sixth reel 416 are the same size as reels 408-412. Fifth reel 414 and sixth reel 416 each include four symbol display positions. Each of fifth reel 414 and sixth reel 416 are configured to display symbols that cover one symbol display positions and two symbol display positions.

The different reel sizes and symbol sizes, as illustrated in FIG. 4, define a clearly recognizable hierarchy of symbols that emphasize big win potentials. In the example embodiment, symbols displayed on reels 404 include "bonus" symbols, "prize" symbols, "scatter" symbols, and "standard" symbols. Each reel is configured to display different types of symbols. In the example embodiment, bonus symbols are only displayed on first reel 406. A "bonus" symbol is three symbol positions in height and may cover all three symbol display positions of first reel 406. The size of the bonus symbol is used to visually indicate, to the player, a significant win potential associated with the bonus symbol. The example base game includes four bonus symbols, each associated with a different bonus feature of the base game. The appearance of a bonus symbol may trigger a different type of bonus feature (e.g., multipliers, "wild" symbols, extra standard symbols, cash prizes, or credit prizes). The bonus symbols are described in greater detail below.

A prize symbol, in some embodiments, may be one, two, or three symbol display positions in height, and may additionally display an award. For example, prize symbols displayed by sixth reel 416 are two-high symbols and may appear with a credit award or a jackpot bonus (e.g., a progressive jackpot indicator). In the example embodiment, wins that include the prize symbol(s) with identified awards will award the prize shown on the prize symbol (e.g., a displayed credit award amount or a progressive jackpot value) in addition to the normal Reel Power pay for that symbol combination (e.g., an "of-a-kind" win).

A scatter symbol, in the example embodiment, covers one symbol display position and is configured to unlock scatter features when a certain number of the same scatter symbol appears on play area 402 during a single gameplay (e.g., during a single spin). Scatter symbols may be displayed by second reel 408, third reel 410, fourth reel 412, fifth reel 414, and sixth reel 416. A variety of scatter symbols may be displayed on play area 402, including "grand prize" symbols (e.g., indicating a maximum payout, such as a grand prize, top prize, or jackpot associated with the base game), "free spin" symbols (e.g., indicating a free play), and "feature game" symbols (e.g., configured to trigger a feature game described herein). In the example embodiment, the appearance of three or more of the same type of scatter symbol during a single play unlocks the associated scatter feature. For example, if three "free spin" symbols are displayed on play area 402, the player unlocks a free spin. In another example, if three "grand prize" symbols are displayed on play area 402, the player wins the grand prize associated with the base game. In yet another example, if three "feature game" symbols are displayed on play area 402, the feature game (e.g., a bonus game) is activated for play.

As used herein, a "standard" symbol may refer to any symbol that is not a bonus symbol, prize symbol, or scatter symbol. As used herein, a "wild" symbol may refer to any symbol capable of substituting (e.g., on a line win or ways win) for another standard symbol.

FIGS. 5-9, as described below, illustrate example bonus features activated in the play area 402 when various bonus symbols are displayed on first reel 406. In the example embodiment, a player may place a wager using, for example, a "spin" or "play" button. In response to a player wager, reels 406-416 are simulated to spin and stop, whereby symbols from reels 406-416 may be displayed in a plurality of symbol display positions of play area 402 (e.g., as determined by the RNG output of the game processing backend system 314 of gaming device 200).

In some embodiments, one or more symbol display positions of one or more reels 406-416 may be spun and stopped independently and/or one at a time (or in groups at a time). In the example embodiment, symbol display positions of first reel 406 are stopped first, and may display a bonus symbol while the remaining reels 408-416 continue spinning. The bonus symbol may be one of a first bonus symbol 502 (shown in FIG. 5), a second bonus symbol 504 (shown in FIG. 6), a third bonus symbol 506 (shown in FIGS. 7A and 7B), and a fourth bonus symbol 508 (shown in FIG. 8). In some situations, the first reel 406 may display three one-high symbols or one two-high symbol and one one-high symbol. As described above, each bonus symbol 502-508 are single, three-high symbols covering all three symbol display positions of first reel 406, thus activating an associated bonus feature. In some embodiments, the gaming device 200 may spin and stop the first reel 406 before the other reels 404 to reveal a bonus symbol before activating the bonus feature, thereby providing enhanced excitement and anticipation for the player.

In example embodiments, symbols in the play area 402 are evaluated from left to right as a ways evaluation (e.g., a "Reel Power" evaluation), generating win amounts when one or more feature game symbols are present for two or more of the left-most reels (e.g., "2-of-a-kind" being at least one symbol on the left-most two reels, "3-of-a-kind" being at least one symbol on each of the left-most three reels, and so forth) and generating multipliers on a given reel based on the number of symbols appearing (e.g., "1×" when only one symbol appears, "×2" when two symbols appear, and so forth). More specifically, for each reel, the gaming device 200 determines a total number of each particular symbol appearing on that reel and performs a left-to-right evaluation of each symbol to determine how many of-a-kind to pay, as well as which multipliers may have been achieved based on the number of symbols on the reel. Each of the 3-high bonus symbols 502-508 described herein are evaluated as single wild symbols for purposes of Reel Power evaluation.

Figure 5:
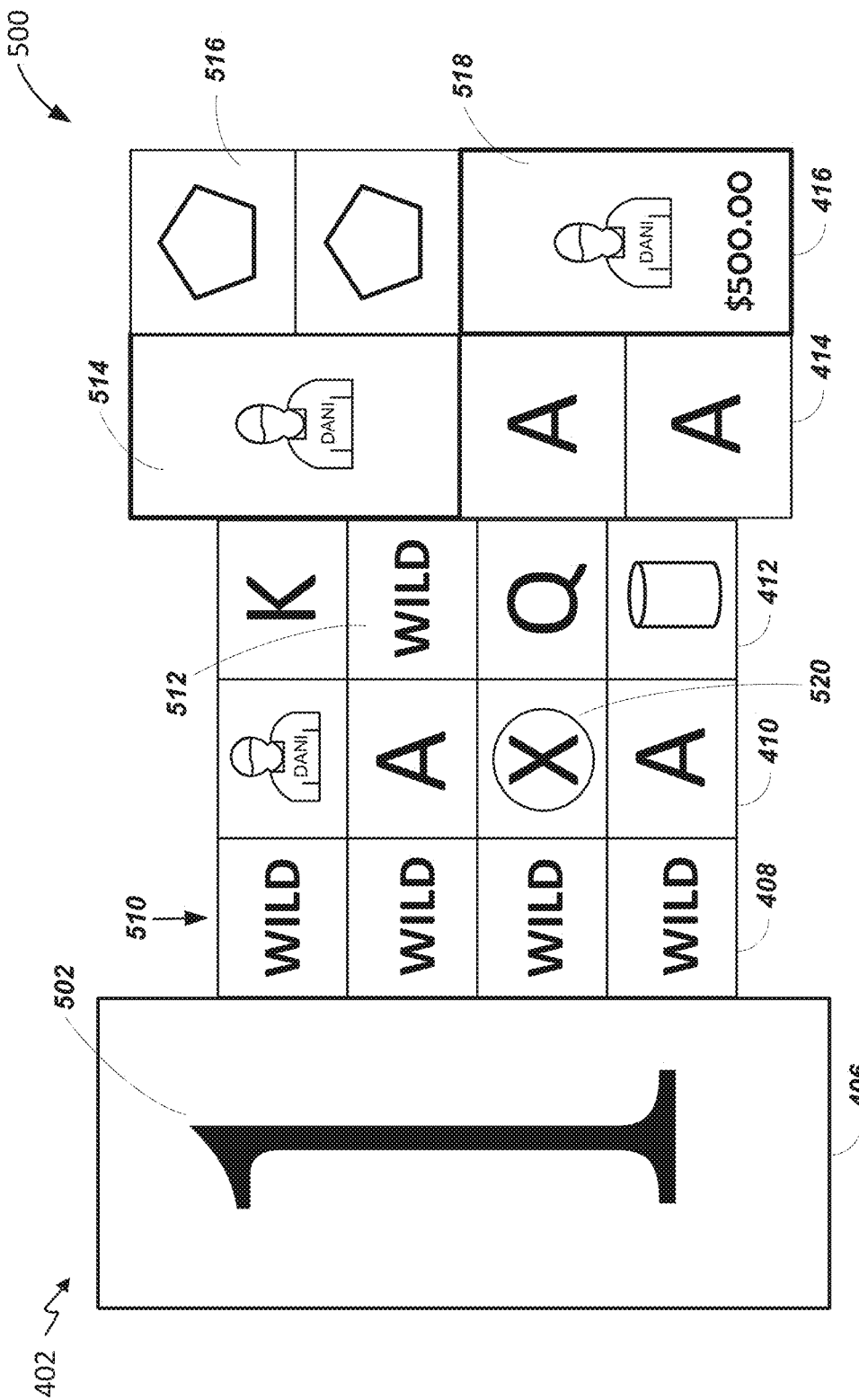
FIG. 5 is a diagram illustrating the play area shown at FIG. 4 when a first bonus feature is activated in the example base game.

FIG. 5 illustrates an example spin result 500 on play area 402 when first bonus symbol 502 is displayed on first reel 406 during a spin. During gameplay, each reel 406-416 may be spun and stopped to display a subset of the symbols of each reel 406-416. In the example embodiment, the appearance of first bonus symbol 502 triggers the gaming device 200 to add one or more wild symbols to display positions on the reels 404 (e.g., overlaying or replacing the symbol(s) that would otherwise have appeared on the reels). In some embodiments, the first bonus symbol 502 triggers addition of from one to four wild symbols on two of the three center reels 408-412 (e.g., a number selected based on an output of the RNG engine 316). In the example shown here, the gaming device 200 adds wild symbols at symbol display positions 510, 512 upon the occurrence of first bonus symbol 502 (e.g., all four symbol positions of reel 408 and the second symbol position of reel 412). In some embodiments, first bonus symbol 502 may cause the addition of any number of wild symbols to symbol display positions of reels 408-416.

In some embodiments, overlays, such as images or characters, may initially appear at symbol display positions 510 and 512 while second reel 408, third reel 410, fourth reel 412, fifth reel 414, and sixth reel 416 continue to spin. In these embodiments, when remaining reels 408-416 stop, wild symbols may appear at symbol display positions 510 and 512, and the remaining symbol display positions of reels 408-416 may be populated with symbols. In some embodiments, symbol display positions of reels 408-416 may populate with prize symbols, such as prize symbol 514, and standard symbols, such as standard symbol 516. In the example shown here, standard symbols displayed on sixth reel 416, such as standard symbol 518 may appear with a credit award or a progressive jackpot value. In some embodiments, the occurrence of a pre-determined number of feature game scatter symbols 520 causes activation of a feature game, which is described in greater detail below.

Figure 6:
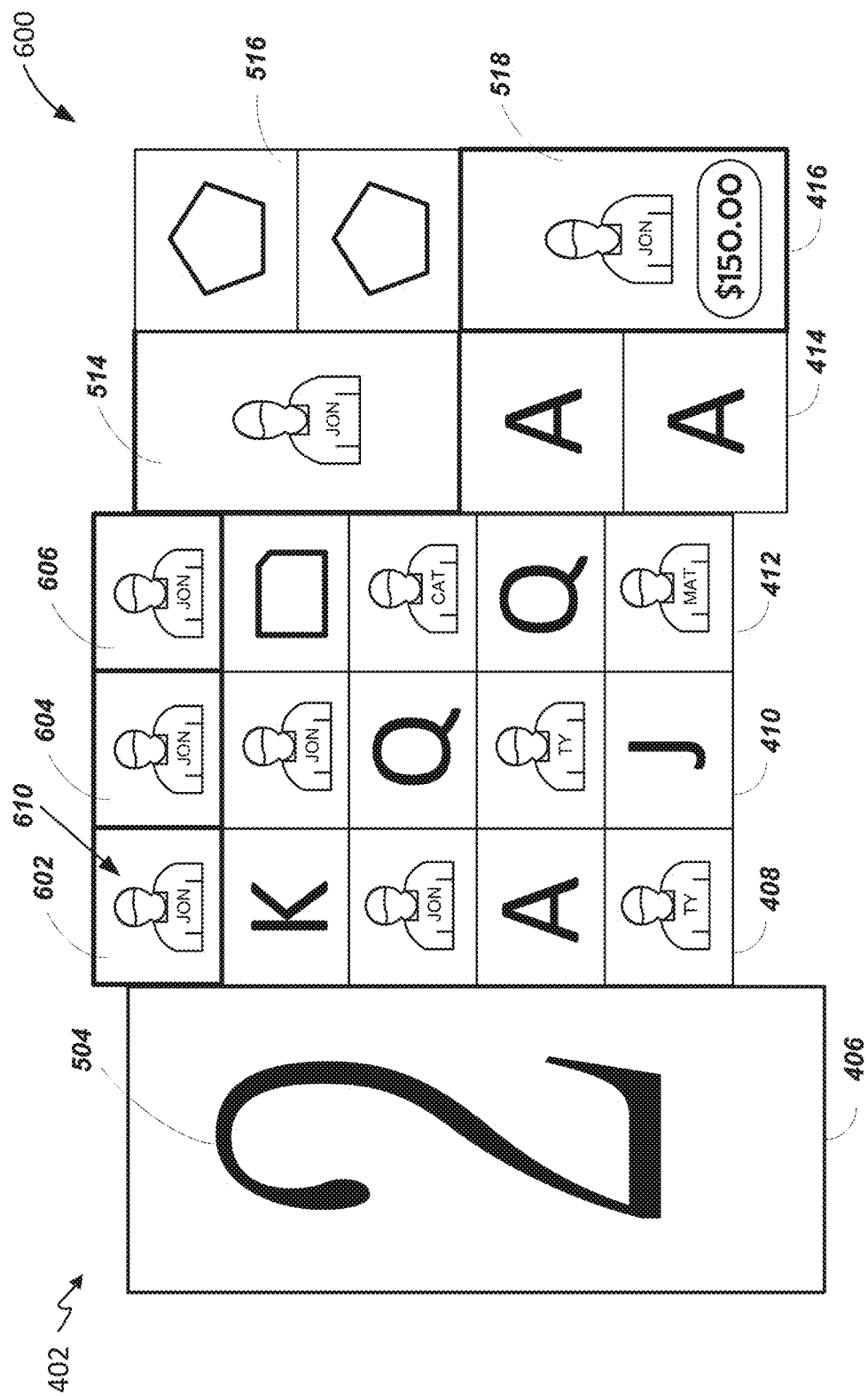
FIG. 6 is a diagram illustrating the play area shown at FIG. 4 when a second bonus feature is activated in the example base game.

FIG. 6 illustrates an example spin result 600 on play area 402 when a second bonus symbol 504 is displayed on first reel 406 during a spin. The appearance of second bonus symbol 504 triggers the addition of one or more extension symbol positions 602, 604, 606 above reels 408, 410, 412, as well as adding a particular symbols to those extension symbol positions 602, 604, 606 on reels 408-412. In other words, one or more of the extension symbol positions 602, 604, 606 are added to the top of reels 408-412, and are populated with a particular symbol (e.g., a standard symbol, a wild symbol, a scatter symbol, or such). In the example embodiment, image symbol 610 is pre-defined as the symbol added to extension symbol positions 602, 604, 606 when the second bonus symbol 504 appears on first reel 406. In other embodiments, the gaming device 200 may select a symbol to be added (e.g., selecting a standard symbol, an image symbol, a feature symbol, or such, based on RNG output of the RNG engine 316). Adding one or more expansion symbol display positions 602, 604, 606 with symbols to reels 408-412, for example, increases a player's chances of higher of-a-kind win awards and further increases a player's chances of achieving a trigger condition (e.g., four-of-a-kind, six-of-a-kind) to win an award based upon the symbol evaluation of reels 408-416. In the example shown here, the addition of extension symbol positions 602, 604, 606 and the "JON" image symbols 610 has increased the outcome from 3-of-a-kind "JON" image symbols 610 with only ×1 multipliers in each of the first three reels to a 6-of-a-kind "JON" image symbols 610 with four ×2 multipliers (e.g., for reels 408, 410, 414, and 416, with 2-high "JON" image symbols 610 counting as two symbols). In addition, since the "JOHN" image symbols 610 completed a 6-of-a-kind, and since the "JON" image symbol 610 appearing on the sixth reel 416 includes an additional cash award (e.g., $150.00), the player is also awarded that additional cash award.

Figure 7A:
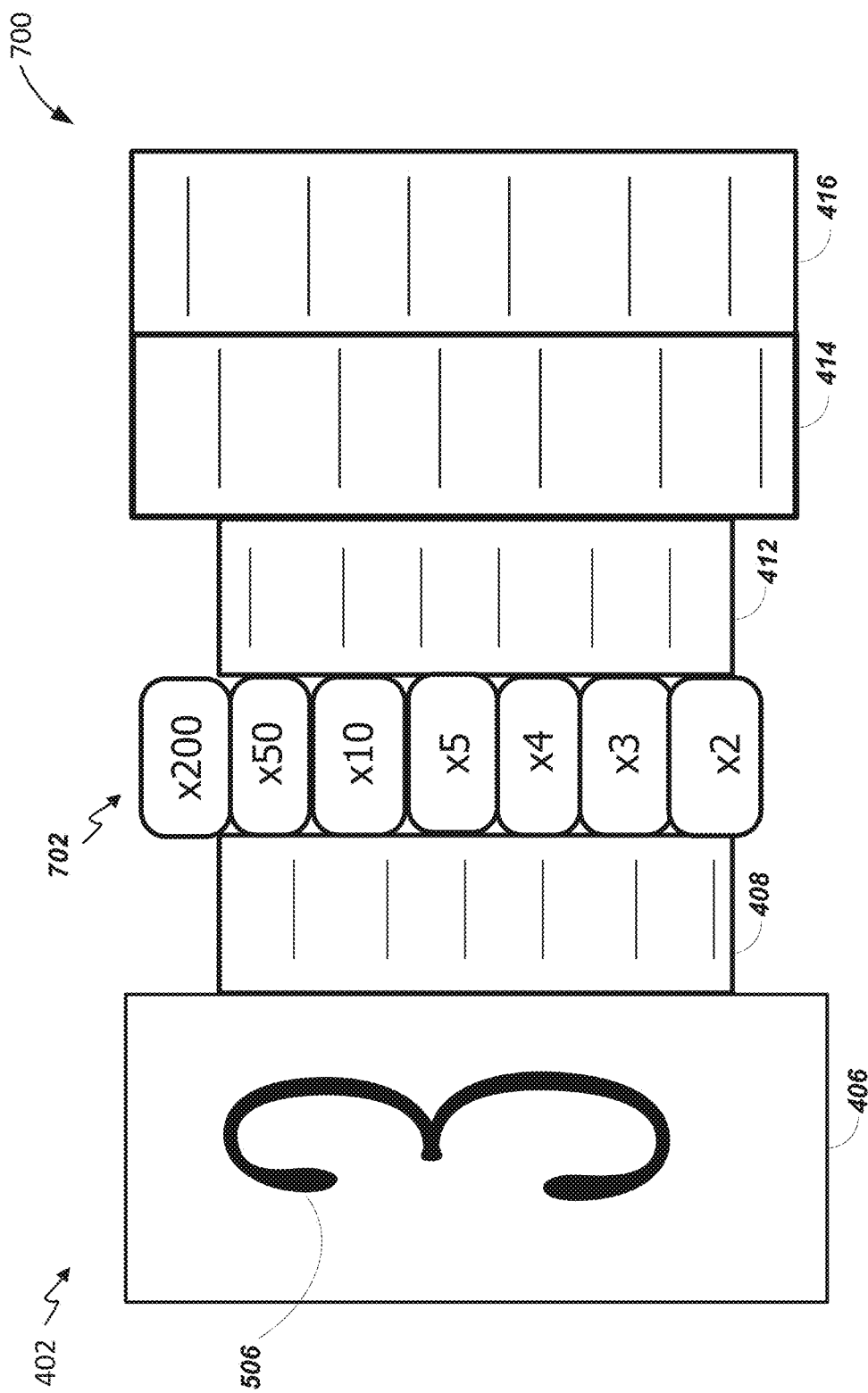
FIGS. 7A-7B is a diagram illustrating the play area shown at FIG. 4 when a third bonus feature is activated in the example base game.
Figure 7B:
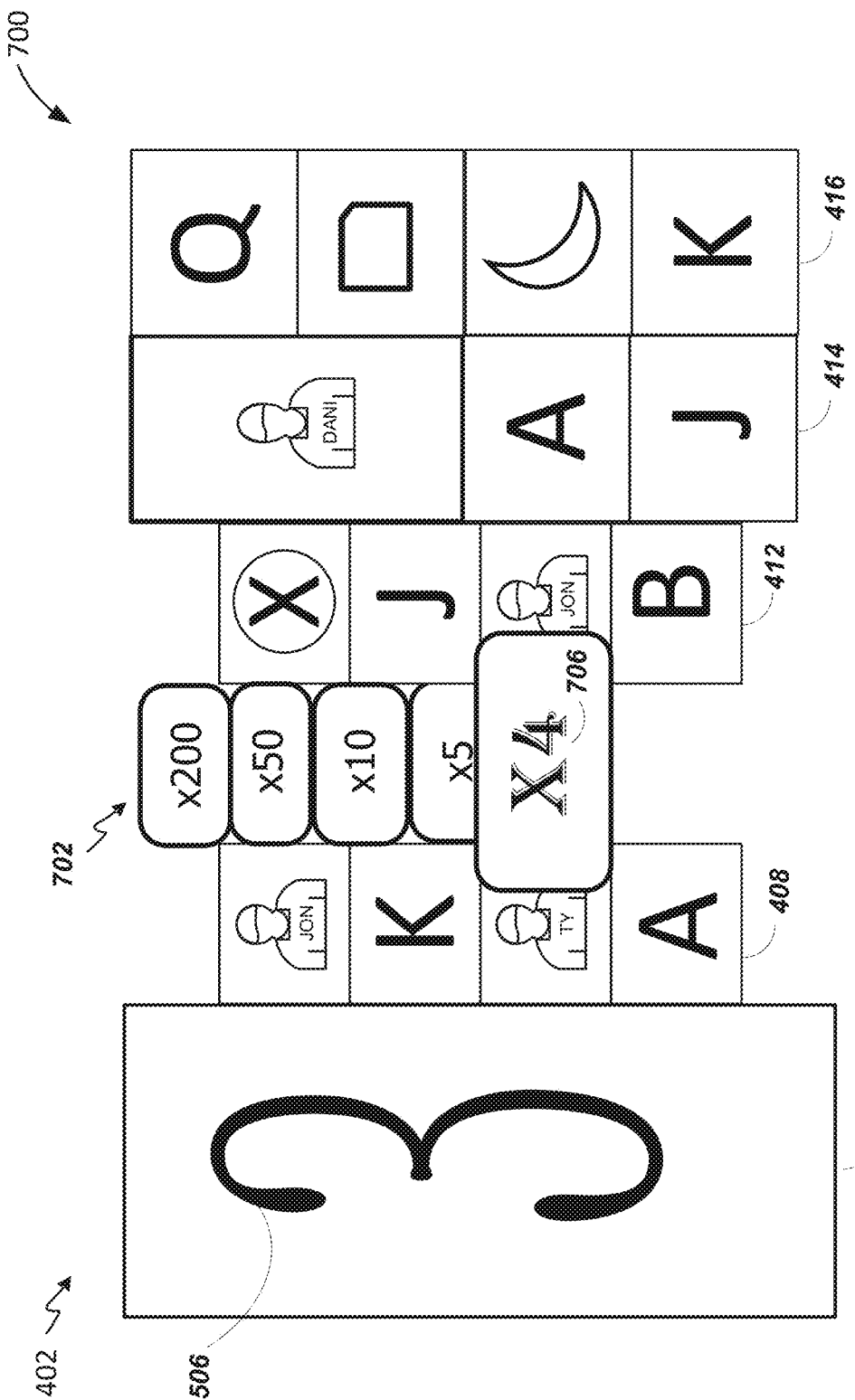

FIGS. 7A and 7B illustrate an example spin result 700 on play area 402 when the third bonus symbol 506 is displayed on first reel 406 during a spin. In the example embodiment, during a spin, first reel 406 is stopped to display third bonus symbol 506 while the remaining reels 408-416 continue to spin. The display of third bonus symbol 506 on first reel 406 prompts gaming device 200 to replace third reel 410 with a multiplier ladder (e.g., multiplier thermometer) 702. As shown in FIG. 7A, second reel 408, fourth reel 412, fifth reel 414, and sixth reel 416 are still in motion (e.g., still spinning) after multiplier ladder 702 replaces third reel 410 on play area 402. As reels 408, 412, 414, and 416 continue to spin, rungs of multipliers on multiplier ladder 702 light up (or change in color and/or size) in ascending order from the bottom to provide a visual cue to the player that a multiplier is being chosen. The multipliers of multiplier ladder 702 may individually light up (e.g., from "×2" to "×3" to "×4") or be removed until gaming device 200 stops on an award multiplier 706, as shown in FIG. 7B. As described herein, award multiplier 706 is a multiplier from multiplier ladder 702 that is awarded to the player (e.g., applied to the wager resolution). As shown in FIG. 7B, when an award multiplier 706 (e.g., "×4" multiplier) is displayed, award multiplier 706 will change in size and/or color, and remaining reels 408, 412, 414, and 416 will subsequently stop and populate symbol display positions with symbols. The multiplier ladder 702 itself acts as a single wild symbol for reel 3 during evaluation and award determination, while additionally applying the determined multiplier 706 to the total number of credits awarded as a result of gameplay of the base game (e.g., under a Reel Power evaluation).

Figure 8:
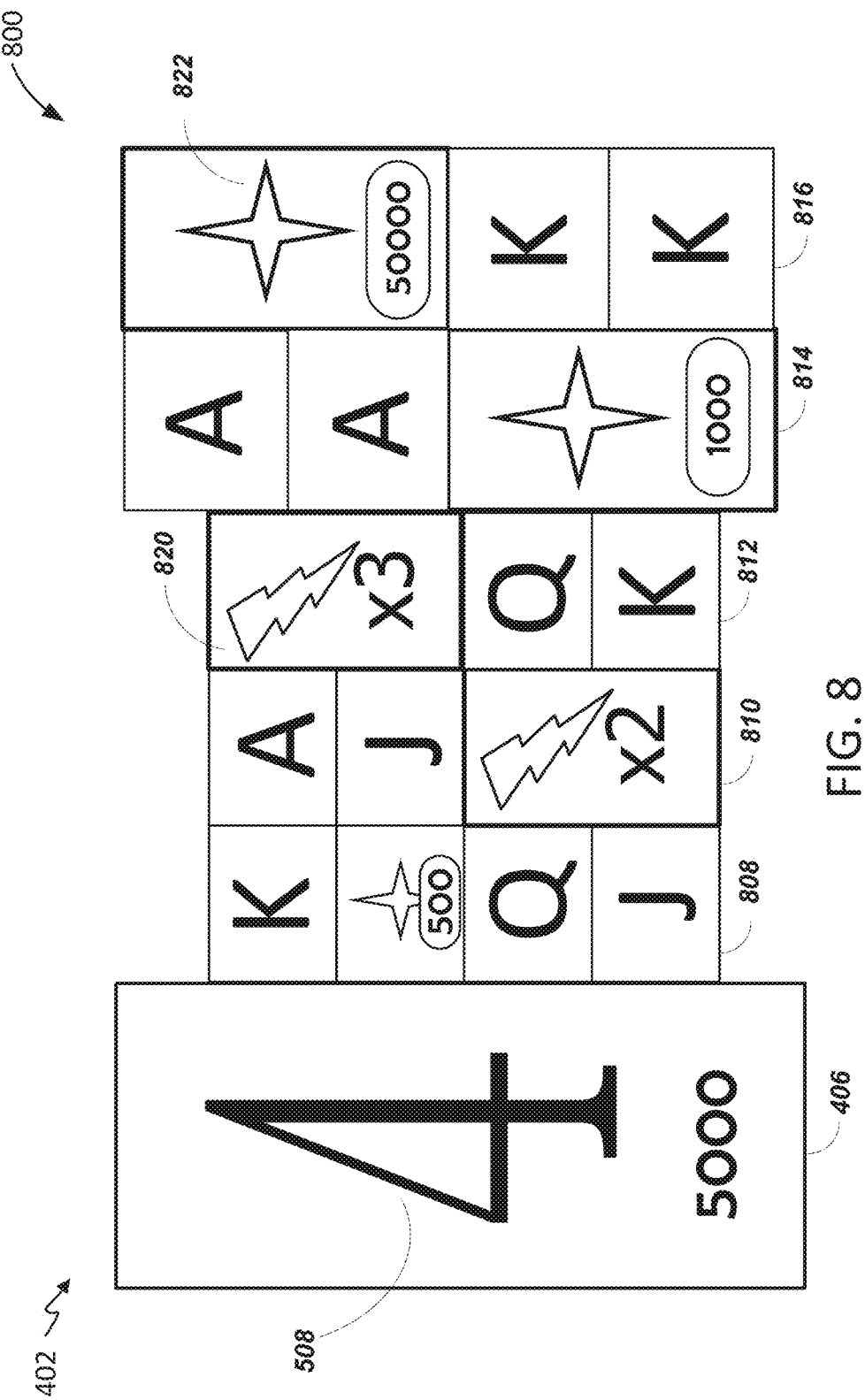
FIG. 8 is a diagram illustrating the play area shown at FIG. 4 when a fourth bonus feature is activated in the example base game.

FIG. 8 illustrates an example spin result 800 on play area 402 when fourth bonus symbol 508 is displayed on first reel 406 during a spin. In the example embodiment, the appearance of fourth bonus symbol 508 triggers gaming device 200 to replace the remaining reels 408-416 of play area 402 with a new set of special reels 808-816. As shown in FIG. 8, special reels 808-816 are different from reels 408-416 (shown in FIG. 4). Special reels 808-816 include a set of special symbols that may be exclusive to fourth bonus symbol 508. In some embodiments, special symbols may be based on a theme associated with fourth bonus symbol 508. Special symbols may cover one or two symbol display positions. Special symbols may include symbols with multipliers (e.g., "×2" and "×3"), such as symbol 820, and symbols with award values, such as symbol 822. In the example shown here, in addition to any Reel Power wins, the player wins all the credits and multipliers displayed on play area 402 (e.g., regardless of whether they appear in an of-a-kind win) and after applying all multipliers displayed in the play area 402 (e.g., to either or both of the Reel Power wins and the displayed credit wins). In some embodiments, a bet qualifier is associated with the occurrence of fourth bonus symbol 508. For example, a minimum or maximum player bet qualification may apply to enable fourth bonus symbol 508 to appear and trigger the replacement of reels 408-416 with special reels 808-816.

In example embodiments described herein, some 2-high and 3-high multi-position symbols are used. One problem with using multi-position symbols with conventional reel spin and stop methods is a problem with split symbols. Typically, stop positions are defined for each single symbol position, and 2-high or 3-high symbols may have 2 or 3 stop positions. However, players may become frustrated when only a portion of a 2-high or 3-high symbol results after a spin. As such, the example embodiments utilize a method of reel spin resolution and play area configuration that avoids such problems.

In the example embodiment, a reel that includes multi-position symbols (e.g., reel 406) is configured with a lookup table that groups symbol positions, and each group of symbol positions is configured to not have any partial multi-position symbols. For example, in one embodiment, a lookup table is defined for a reel that exposes three symbol positions, such as reel 406, as:

TABLE 1

Example Reel Strip Definition Lookup Table

| Index | Symbols | Weight |
|---|---|---|
| 1 | Ace | 15 |
|   | Jack |   |
|   | Raven |   |
| 2 | King | 15 |
|   | Pic1_A |   |
|   | Pic1_B |   |
| 3 | Queen | 20 |
|   | Jack |   |
|   | Ace |   |
| 4 | Pic2_A | 10 |
|   | Pic2_B |   |
|   | Pic2_C |   |
| 5 | Jack | 15 |
|   | King |   |
|   | Queen |   |
| 6 | Pic3_A | 10 |
|   | Pic3_B |   |
|   | Pic3_C |   |

Each entry in Table 1 (identified by Index) represents a single reel stop position for the example reel. Within each lookup table entry, the Symbols illustrate the symbols to display in the three symbol display positions on the reel, as well as the weight attributed to each entry. In other words, when Index 1 is selected (e.g., by the RNG engine 316 and RNG conversion engine 320), an Ace symbol is displayed in the top of three symbol positions on the reel, a Jack symbol is displayed in the middle of three symbol positions, and a Raven symbol is displayed in the bottom of three symbol positions, where each of the Ace, Jack, and Raven symbols are 1-high symbols that fit into a single symbol position. Index 2 illustrates how a 2-high symbol may be configured such as not to be partially displayed. The 2-high symbol, "Pic1", is identified by two sub-symbols, "Pic1_A" and "Pic1_B". When Index 2 is selected, the King symbol is displayed in the top position of the reel, and Pic1 is displayed in the middle and bottom positions of the reel. In some embodiments, Pic1_A may be the top half of the Pic1 symbol and Pic1_B may be the bottom half of the Pic1 symbol. Similarly, two 3-high symbols "Pic2" and "Pic3" are illustrated by Index 4 and Index 6 of the example Table 1. When, for example, Index 4 is selected, Pic2 is displayed in its entirety on the reel (e.g., "Pic2_A" in the top position, "Pic2_B" in the middle position, and "Pic2_C" in the bottom position). In some embodiments, such 3-high symbols may be broken into top, middle, and bottom images to completely render the entirety of the 3-high symbol.

In an example embodiment, the following <reelstripdef> configuration may be used to reflect the 3-high reel of Table 1:

```
<reelstripdef name = "REEL 1">
    <stop symbolname="Ace" weight="10"/>
    <stop symbolname="Jack" weight="0"/>
    <stop symbolname="Raven" weight="0"/>
    <stop symbolname="King" weight="10"/>
    <stop symbolname="Pic1_A" weight="0"/>
    <stop symbolname="Pic1_B" weight="0"/>
    <stop symbolname="Queen" weight="10"/>
    <stop symbolname="Jack" weight="0"/>
    <stop symbolname="Ace" weight="0"/>
    <stop symbolname="Pic2_A" weight="10"/>
    <stop symbolname="Pic2_B" weight="0"/>
    <stop symbolname="Pic2_C" weight="0"/>
    <stop symbolname="Jack" weight="10"/>
    <stop symbolname="King" weight="0"/>
    <stop symbolname="Queen" weight="0"/>
    <stop symbolname="Pic3_A" weight="10"/>
    <stop symbolname="Pic3_B" weight="0"/>
    <stop symbolname="Pic3_C" weight="0"/>
```

While some of the individual <stop> entries in the <reelstripdef> identify individual weights set to zero, each of those <stop> entries have an effective non-zero weight, namely the weight of the first of their grouping of three. In other words, when the non-zero weighted sub-symbol is selected, that symbol will always occupy the first position in the play area and the other two "weight=0" symbols will always be the second and third symbols displayed in the play area. As such, the non-zero weight of the group is effectively shared with all three members. As long as the lookup table and <reelstripdef> are configured to not include any incomplete 2+high symbol parts, then no partial 2+high symbols will occur. This method can be used with any height reel (e.g., 4-high reels, 5-high reels) and any 2+height symbols (e.g., 4-high symbols, 5-high symbols) up to the height of the reel.

Since the reel strip definition table is not defined with any partial symbols, no RNG outcome will yield a partial reel. Further, under Reel Power evaluation, the position of each particular symbol within a single index is irrelevant for purposes of computing win values. Similarly, a reel that exposes four symbol positions, such as reels 408-416, may similarly avoid splitting 2+high symbols by defining lookup tables with four symbols for Index. This method also may satisfy certain jurisdictional requirements since each player has the same opportunity to obtain all winning or losing outcomes, and every symbol displayed is available for random selection and inclusion into a game outcome (e.g., there are no symbols with a weight of zero). While the example Table 1 shown here only includes six entries, it should be understood that any number of entries can be included.

Figure 9:
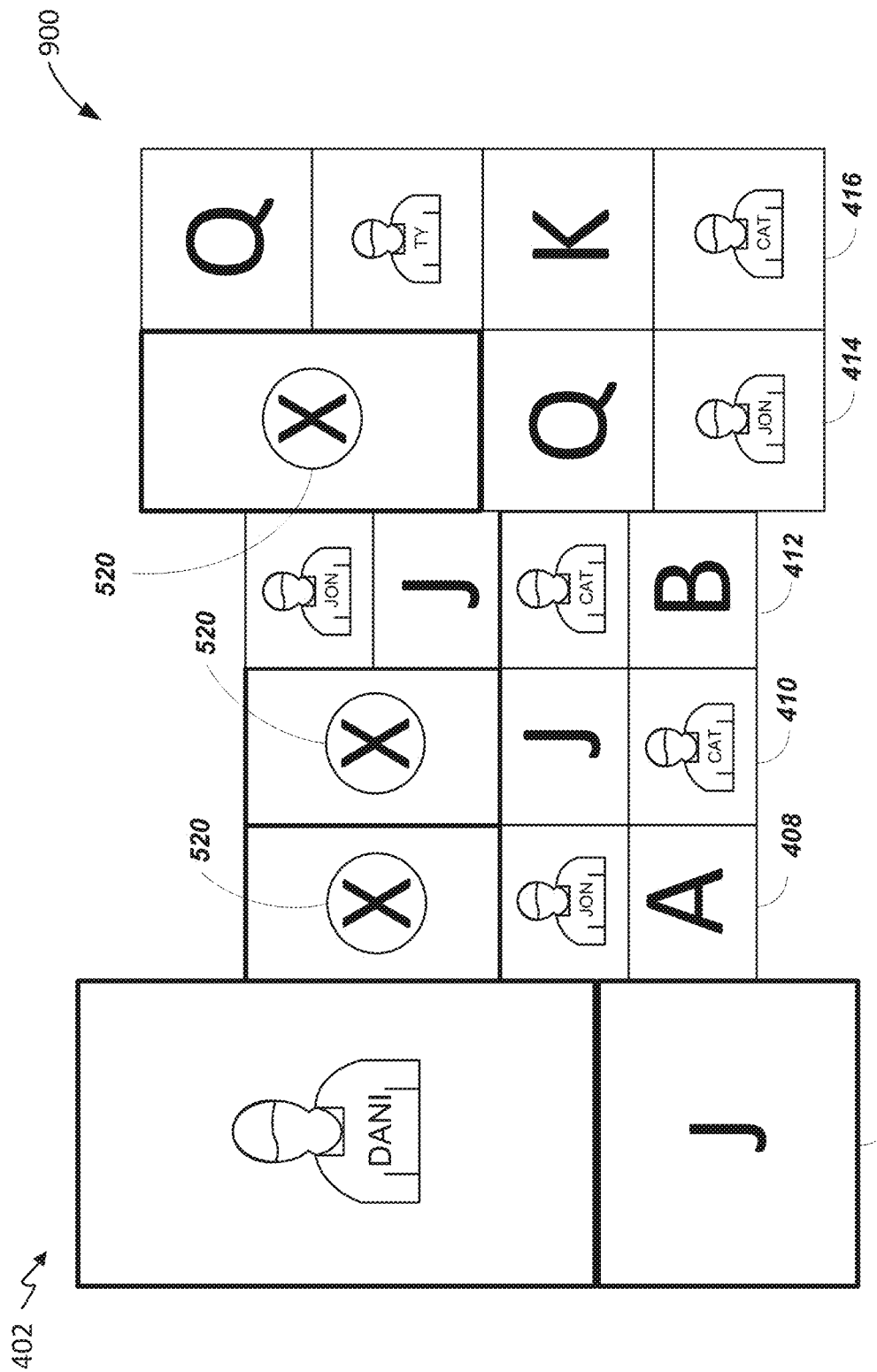
FIG. 9 is a diagram illustrating the play area shown at FIG. 4 when an example feature game is activated.

FIG. 9 illustrates an example spin result 900 in play area 402 that activates a feature game during base game play. In the example embodiment, the feature game is activated based on the appearance of a pre-determined number of feature game scatter symbols (illustrated here as "X") 520 displayed on play area 402 after a spin. In this example, three feature game scatter symbols 520 appear (e.g., on reels 408-416) to unlock the feature game. As shown in configuration 900, feature game scatter symbols 520 are displayed on second reel 408, third reel 410, and fifth reel 414, thereby triggering the feature game.

FIGS. 10A-10E are diagrams illustrating game play progression for an example game instance of the feature game triggered in FIG. 9. As explained above, the feature game is a bonus game separate and distinct from the base game. In the example embodiment, the feature game replaces the reels 404 with a new set of three feature game reels that includes a first feature game reel 1006, a second feature game reel 1008, and a third feature game reel 1010. The player may initiate each spin using player input button 236. As explained below, in some embodiments, the player is awarded five free spins (e.g., one for each round of play of the feature game) and may play up to seven rounds of the feature game (e.g., by winning additional free plays on the fifth and sixth spin).

Figure 10A:
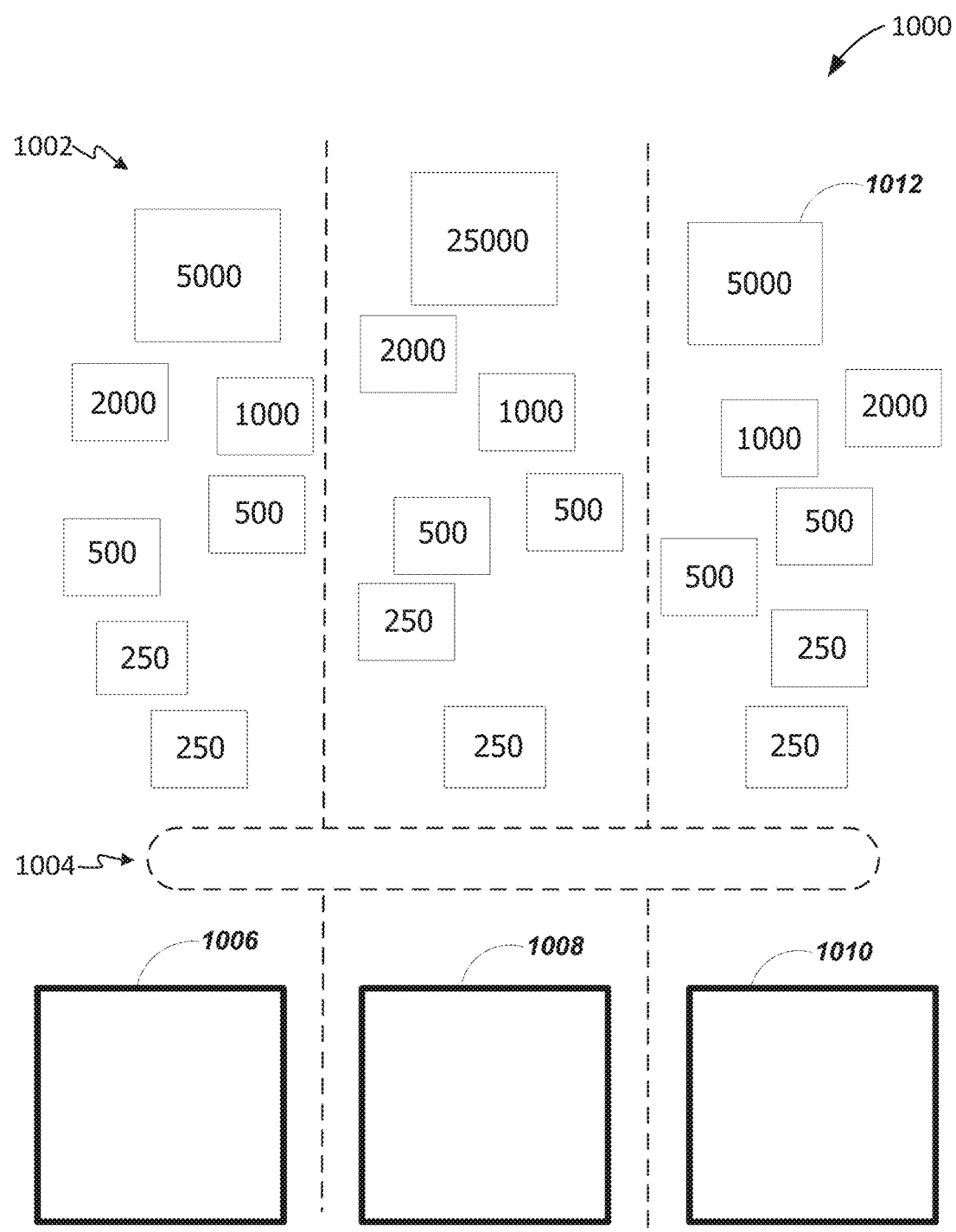
FIGS. 10A-10E are diagrams illustrating game play progression for the example feature game.

FIG. 10A depicts a feature game play area 1000 for the feature game. In particular, FIG. 10A depicts play area 1000 before the gaming device 200 initiates a first round of play. Feature game play area 1000 includes a credit stack 1002, a prize position area 1004, and the set of game reels 1006, 1008, 1010. Feature game play area 1000 may be displayed using one or both of primary game display 240 and secondary game display 242 (both shown in FIG. 2). For example, feature game reels 1006-1010 and prize position area 1004 may be displayed on the primary game display 240, which may be positioned below the secondary game display 242, and credit stack 1002 may be presented by secondary game display 242.

In the example embodiment, the feature game provides credit prizes 1012 that may be won by the player for each spin. The credit prizes 1012 are represented in FIG. 10A as three columns of credit values in the credit stack 1002, and each column associated with one of the reels 1006-1010 (e.g., as indicated by the broken line columns). Credit prizes 1012, in the example embodiment, range from 250 to 25,000, and each credit prize 1012 corresponds to one of the seven rounds of play of the feature game. There are seven credit prizes 1012 in each column, sorted from lowest to highest value, with the lowest credit prize 1012 in each column being associated with the first round of play, the next lowest credit prize 1012 being associated with a second round of play, and so forth. During game play, one credit prize 1012 in each column shifts down into the prize position area 1004 before the spin, making that credit prize 1012 available to win based on the spin result of the associated reel 1006-1010. Credit prize cascading is described in greater detail below.

Each of the feature game reels 1006-1010 includes symbol strip that includes winning symbols and blank spaces (or non-winning symbols). Further, in some embodiments, each reel 1006-1010 may use one or more winning symbols that are distinct from other winning symbols on the other reels 1006-1010 (e.g., for thematic purpose). In the example embodiment, each reel 1006-1010 presents one symbol display position (e.g., either a single winning symbol or a blank) after a spin. In other embodiments, reels 1006-1010 may display two or more symbol display positions. A blank refers to an empty symbol display position on the reel 1006-1010 (e.g., no symbol shown). During game play, the appearance of a winning symbol on a reel indicates a win for that reel during the current spin, where the appearance of only blank(s) or non-winning symbol(s) indicates no win for that reel. In some embodiments, a non-winning symbol representing no win may be used in lieu of an empty symbol position.

Figure 10B:
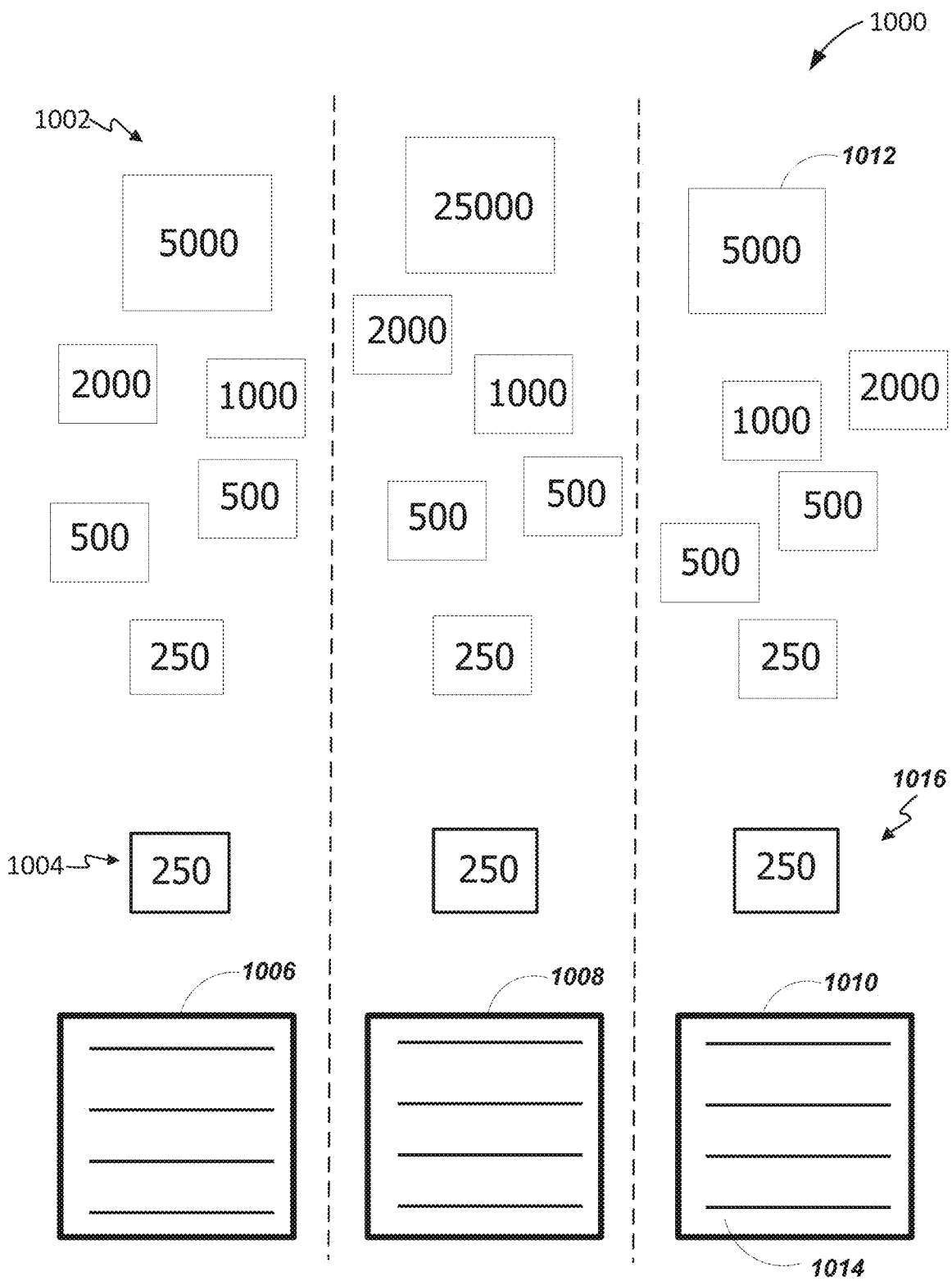

FIG. 10B depicts a first round of play of the feature game instance. When a player initiates gameplay by, for example, pressing a spin button (e.g., a player input button 236), a first prize row 1016 of credit prizes 1012 moves down from credit stack 1002 into prize position area 1004. As first prize row 1016 populates prize position area 1004, credit prizes of credit stack 1002 move down (e.g., advancing closer to the prize position area 1004). First prize row 1016 may be highlighted or illuminated to distinguish first prize row 1016 from the other rows of credit stack 1002 (e.g., indicating that the credit prizes 1012 in the prize position area 1004 are available to win during this spin). While first prize row 1012 occupies prize position area 1004, feature game reels 1006-1010 are spun. As show in FIG. 10B, credit values of "250" are displayed in prize position area 1004 while reels 1006-1010 are in motion.

Figure 10C:
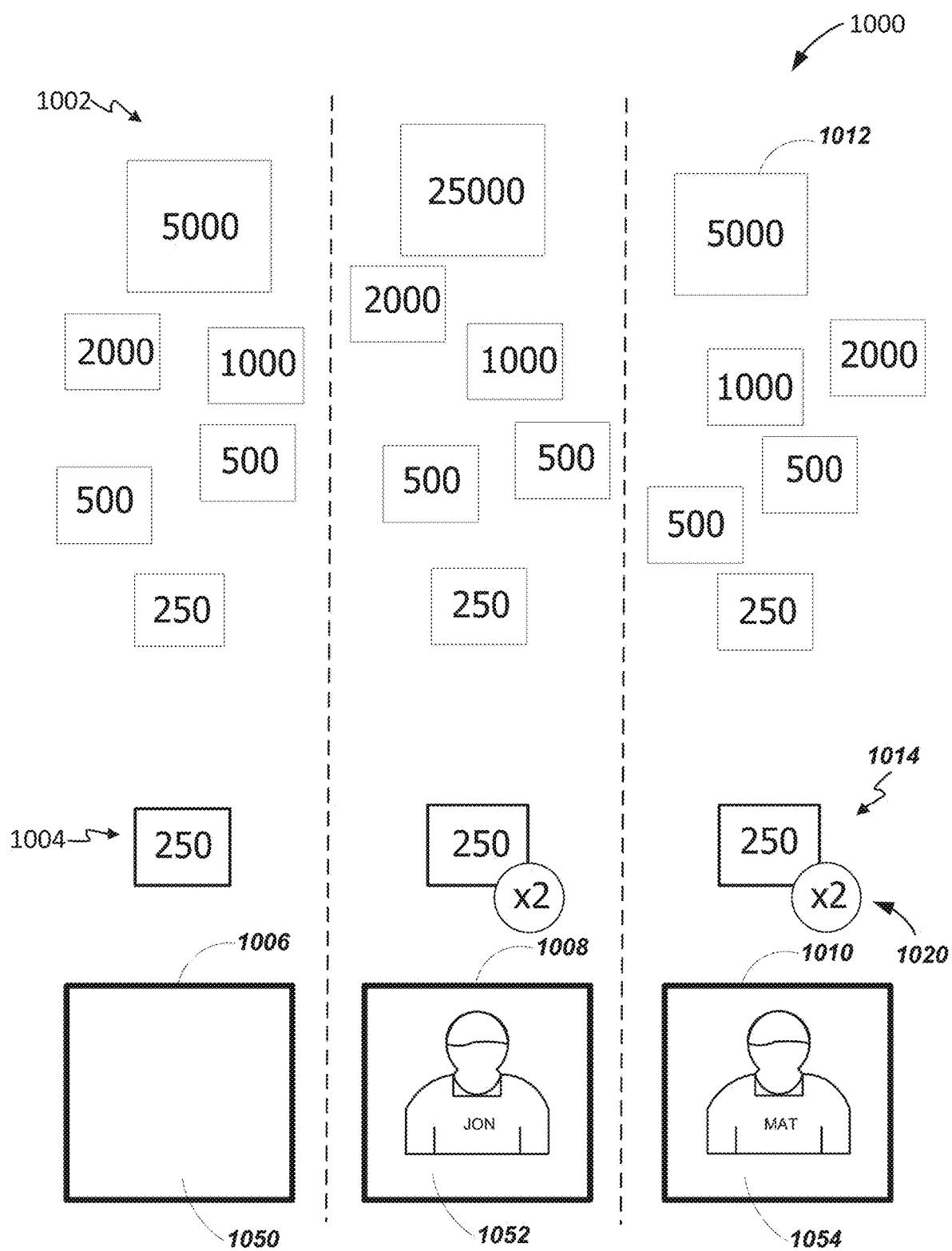

FIG. 10C depicts an outcome of the first round of play after feature game reels 1006-1010 have stopped spinning. In the example embodiment, each feature game reel 1006-1010 exposes either a winning symbol or an empty position. When a winning symbol (e.g., winning symbols 1052, 1054) is displayed after the spin, the player wins the credit prize 1012 for that reel (e.g., the credit prize 1012 in the prize area 1004 above that reel). When an empty position 1050 is displayed, the player does not win the credit prize 1012. In this example, first feature game reel 1006 display an empty position, and second and third reels 1008, 1010 display prize symbols 1052, 1054. As such, the player does not win the 250 credit prize above the first reel 1006, but does win both of the 250 credit prizes above the second and third reels 1008, 1010. Credit prizes above each feature game reel 1006-1010 are removed from prize position area 1004 after each reel is evaluated. For example, when second feature game reel 1008 displays the prize symbol 1052, the credit prize and corresponding multiplier above second feature game reel 1008 may be removed or disappear (e.g., after a multiplied credit value is determined, as described below). In another example, when a reel, such as first feature game reel 1006 displays a blank symbol, the credit prize is removed from prize position area 1004 and not awarded to the player.

In the example embodiment, each reel 1006-1010 includes an associated multiplier 1020. The multiplier 1020 for each reel starts at an "×1" multiplier value (e.g., at the beginning of a spin). After a spin is completed, if a win is achieved for a particular reel 1006-1010, the current multiplier 1020 for that reel is applied to the credit prize 1012 to determine the total award for the player. During the first spin shown in FIG. 10B, the associated multipliers 1020 are not displayed since they are only "×1" (e.g., thus having no impact on the total award).

After evaluating each spin result, the associated multiplier(s) 1020 for any winning reels (e.g., reels 1008, 1010, here) are advanced. In the example embodiment, an ordered list of seven multipliers ("multiplier array") is pre-configured as ("×1", "×2", "×3", "×5", "×10", "×11", and "×12") and advancing the reel multiplier for a winning reel includes changing the reel multiplier for that reel to the next highest multiplier in the multiplier array. In this example, the multipliers 1020 for reels 1008, 1010 are advanced from "×1" to "×2". This multiplier 1020 is displayed to the player after resolution of the current spin, indicating to the player that the updated multipliers 1020 shown in FIG. 10C will apply to the next spin. For any losing reels (e.g., reel 1006), the multiplier 1020 for that reel is reset to "×1" (the base value). It should be understood that the multipliers 1020 shown in FIG. 10C are illustrated with their values after resolution of the first spin, and will thus be applied to the results of the next spin result and not the current spin result shown in FIG. 10C.

Figure 10D:
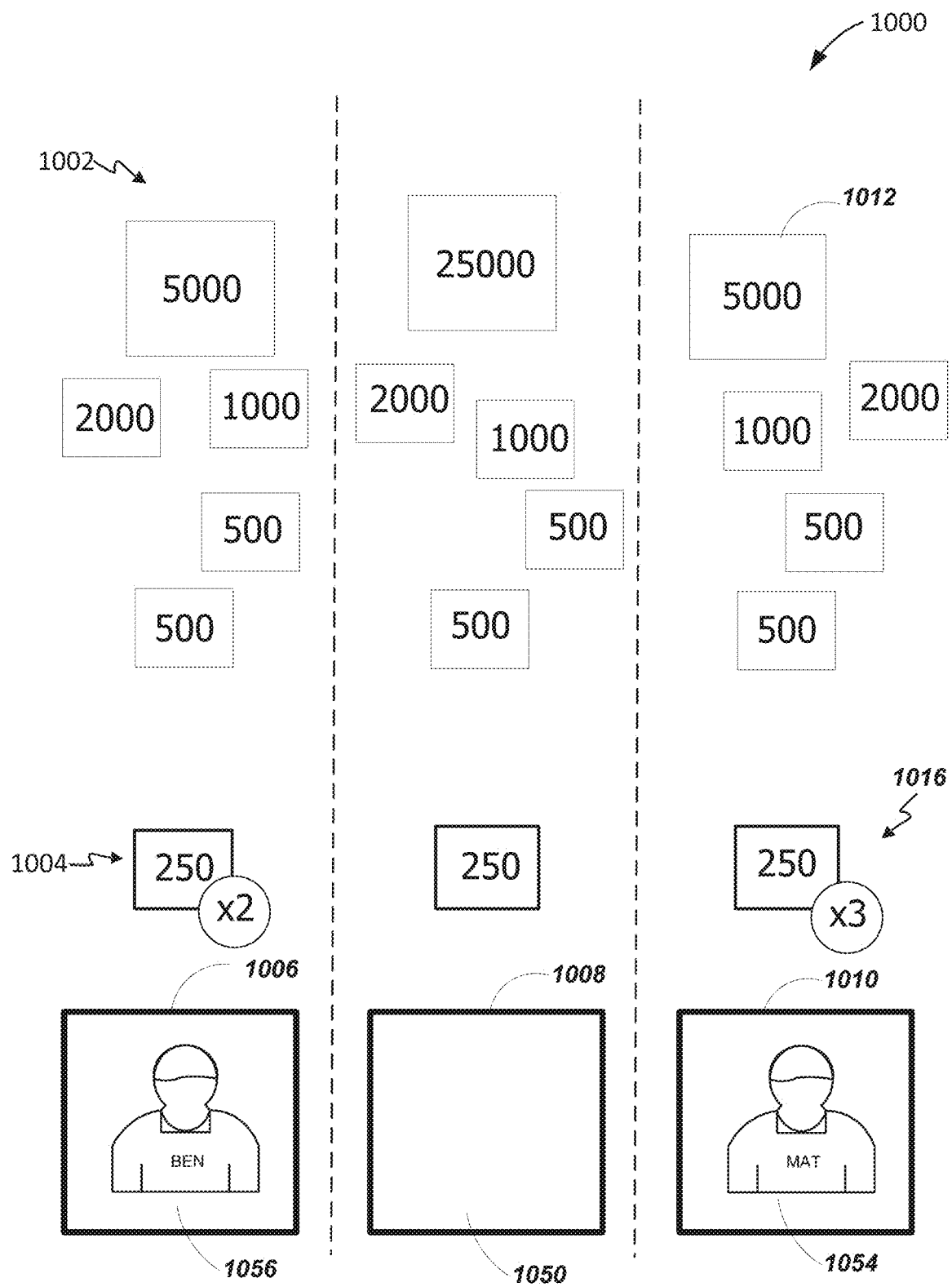

FIG. 10D depicts a second round of play after feature game reels 1006-1010 are stopped. When the player initiates the second round of gameplay, a second prize row 1016 of credit prizes shift down from credit stack 1002 into prize position area 1004. As second prize row 1016 populates prize position area 1004, credit prizes of credit stack 1002 proceed to move down within the credit stack 1002. As shown in FIG. 10D, second feature game reel 1008 displays blank symbol 1050, indicating a no-win event, where reels 1006, 1010 display prize symbols 1056, 1054, respectively. The occurrence of prize symbol 1056 indicates that the player wins the credit prize (e.g., "250") for first feature game reel 1006. During prize evaluation, since the first reel 1006 did not win during the previous spin, the applicable multiplier 1020 is "×1", and thus has no impact on the award for that reel 1006. As such, the player wins 250 credits for reel 1006. Since the second reel 1008 is blank, no credit award is won. The occurrence of prize symbol 1054 indicates that the player wins the credit prize (e.g., "250") for the third game reel 1010. Further, since the third reel 1010 won during the first spin, the "×2" multiplier shown in FIG. 10B is effective for the current spin. As such, the player is awarded 250×2=500 credits for the third reel 1010.

After resolution of the second round, the gaming device 200 updates the multipliers for the reels 1006-1010. More specifically, since the first reel 1006 won this round, the multiplier 1020 for the first reel 1006 is advanced to "×2". Since the third reel 1010 won this round, the multiplier 1020 for the third reel 1010 is advanced from "×2" to "×3". Since the second reel 1008 lost this round, the multiplier 1020 for the second reel 1008 is reset to "×1".

Figure 10E:
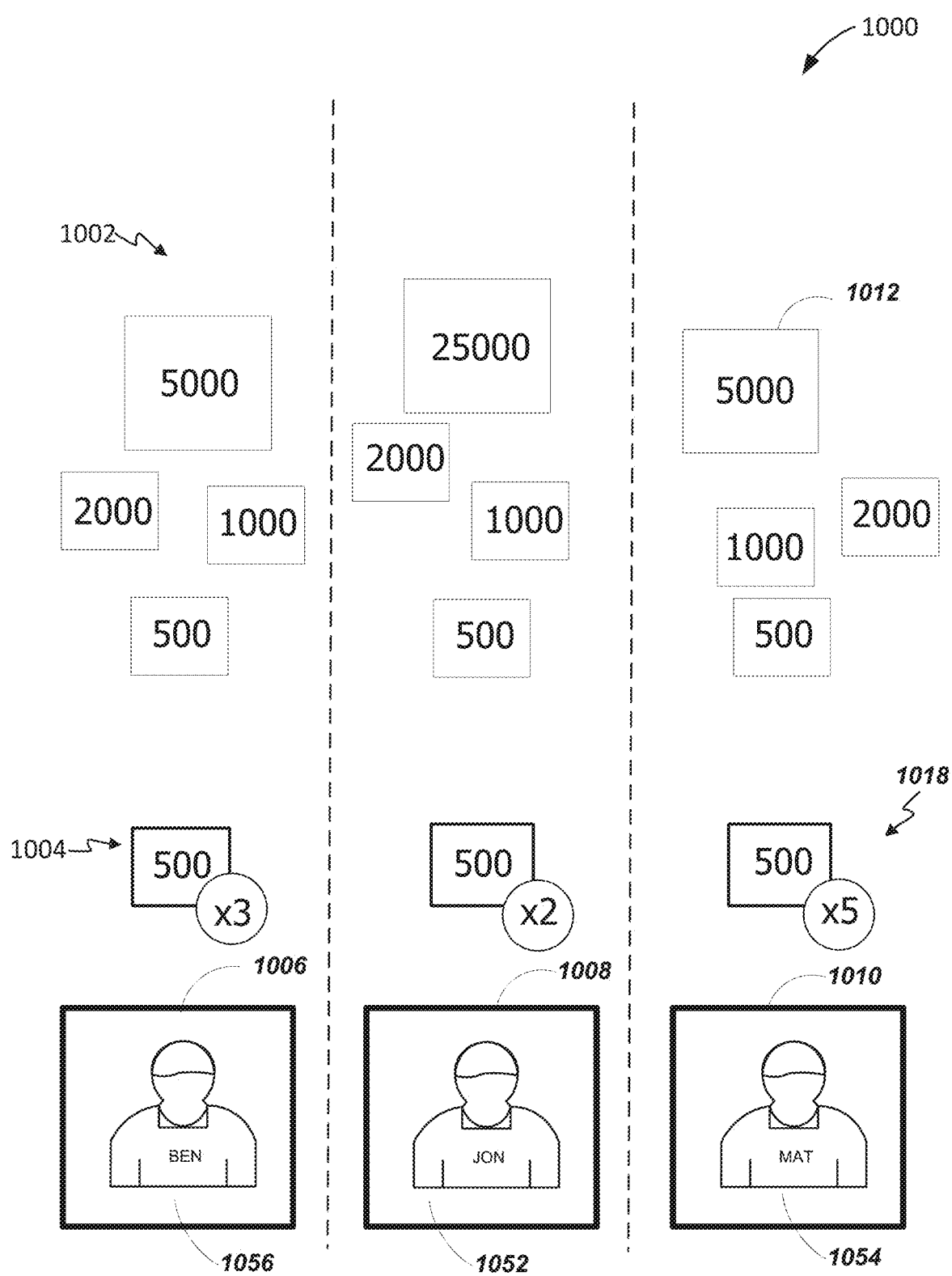

FIG. 10E depicts a third round of play after reels 1006-1010 are stopped. When the player initiates the third round of gameplay, a third prize row 1018 of credit prizes shift down from credit stack 1002 into prize position area 1004. As third prize row 1018 populates prize position area 1004, credit prizes of credit stack 1002 continue to shift down. As shown in FIG. 10E, each of the feature game reels 1006, 1008, 1010 displays prize symbols 1056, 1052, 1054, respectively. The occurrence of prize symbol 1056 indicates that the player wins the credit prize 500×2=1,000 credits for first feature game reel 1006, and the associated multiplier 1020 is then increased to "×3". The occurrence of prize symbol 1052 indicates that the player wins the credit prize 500×1=500 credits for second feature game reel 1008, and the associated multiplier 1020 is then increased to "×2". The occurrence of prize symbol 1054 indicates that the player wins the credit prize 500×3 for third feature game reel 1010, and the associated multiplier 1020 is then increased to "×4".

In the example embodiment, the applicable multiplier is increased in increasing amounts (e.g., ×2, ×3, ×5, ×10, and so forth, as defined in the multiplier array). In some embodiments, the applicable multiplier for a round of gameplay is increased in increments of one (e.g., ×2, ×3, ×4, and ×5). The application of multipliers in conjunction with the increasing credit award values of later rounds allows the feature game to offer increased volatility, while RTP may be controlled based on determined probabilities of having the various multipliers at the various rounds of play. Since the sixth and seventh rounds have the largest values, those awards will be less frequent since they will only be winnable if the player wins at least once on the fifth round of play.

Although not shown in FIGS. 10A-10E, in the example embodiment, two additional rounds of play continue until a player is out of free spins (e.g., five free spins). During the fourth round of play, a fourth prize row of credit prizes 1012 descend from credit stacks 1002 into prize position area 1004. The fourth prize row includes credit prize having a value of "500." Game play will operate in substantially the same manner as described above. During the fifth round of play, a fifth prize row of credit (not shown) will descend from credit stacks 1002 into prize position area 1004. Each credit prize of the fifth prize row has a value of "1000."

By the end of the fifth round of gameplay, six potential credit prizes remain in credit stack 1002 for potentially a sixth and seventh round of play. In the example embodiment, a player is awarded a sixth round of play (e.g., a free sixth spin) if at least one credit prize 1012 is won during the fifth round of play. Subsequently, if the player advances on to the sixth round of play, the player will need to win at least one credit prize during gameplay to be awarded a seventh and final round of play. As shown in FIG. 10E, the credit prizes allotted for the seventh round of play are "5000" for first feature game reel 1006, "25000" for second feature game reel 1008, and "5000" for third feature game reel 1010. Furthermore, as the credit prizes reserved for the seventh round of gameplay are significant, the feature game may encourage players to actively play the example base game (as shown in FIGS. 4-9) in efforts to reach the sixth and seventh round of gameplay, thereby increasing player in the base game and improving user interaction with the game machine.

Figure 11A:
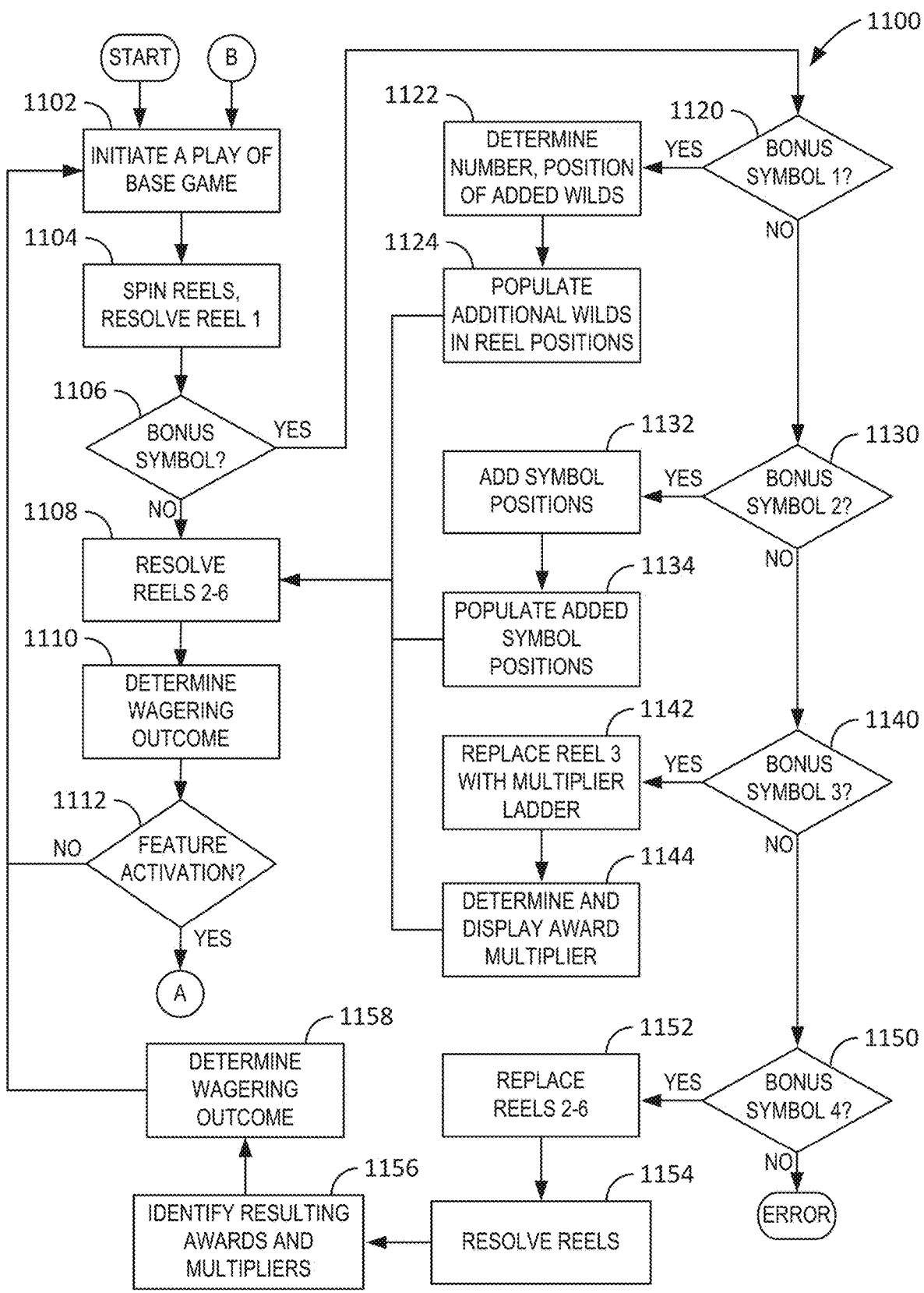
FIGS. 11A-11B are a flowchart for a method of providing the base game features and feature game described herein.
Figure 11B:
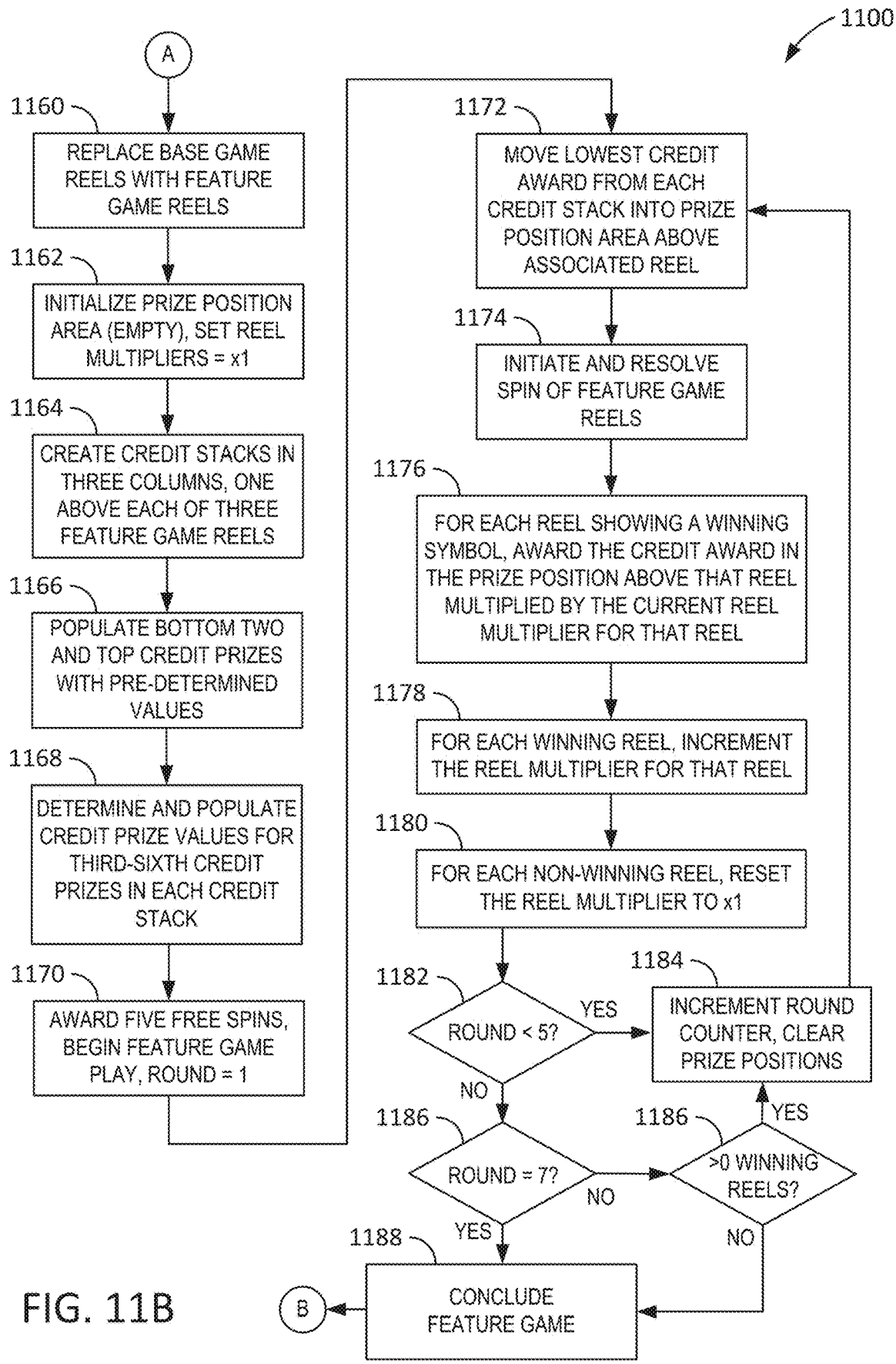

FIGS. 11A-11B are a flowchart 1100 for a method of providing the base game features and feature game described herein. In the example embodiment, the method is performed by an EGM such as gaming device 200 using the six-reel configuration illustrated in FIG. 4 for the base game and the three-reel configuration illustrated in FIGS. 10A-10E for the feature game. In some embodiments, one or more of the operations of this method may be performed by a backend server (e.g., server systems 108, 110, 112, 114, or the like). In FIG. 11A, the method begins with initiating a play of the base game at operation 1102 (e.g., upon submission of a wager by a player). At operation 1104, the gaming device 200 begins all reels spinning and resolves (e.g., stops) reel 1. If, at test 1106, no bonus symbol is displayed, then the gaming device 200 resolves the remaining reels (e.g., reels 2-6) at operation 1108. At operation 1110, the gaming device 200 determines a wagering outcome of the spin result (e.g., under a Reel Power evaluation) and awards the player the determined amount. At test 1112, the gaming device 200 evaluates the spin result to determine if the feature game trigger criteria are met (e.g., the appearance of three scatter symbols or such, as described above with respect to FIGS. 4 and 9. If the feature game trigger criteria are not met, then the gaming device 200 returns to operation 1102 to allow the player to initiate the next round of play. If the feature game trigger criteria are met, then the feature game is activated. FIG. 11B illustrates additional details regarding the feature game.

Returning to operation 1106 of the base game, if a bonus symbol does appear on reel 1, then the gaming device 200 activates the associated feature (e.g., based on which bonus symbol appears). Bonus symbols and their various features are described above with respect to FIGS. 5-9. In the example embodiment, if the first bonus symbol (e.g., as shown and described in FIG. 5) appears on reel 1 at test 1120, then the gaming device 200, at operation 1122, determines a number of wild symbols to be added and their various positions of appearance on the play area. At operation 1124, the gaming device 200 populates the additional wilds into the determined reel positions and then returns to operation 1108 to continue resolving reels 2-6 and evaluating the outcome of the spin (e.g., with the additional wilds overlaying or replacing other symbols at their determined positions).

If, at test 1130, the second bonus symbol (e.g., as shown and described in FIG. 6) appears on reel 1, then the gaming device adds additional symbol positions (e.g., expansion symbol positions) to the reels (e.g., to one or more of reels 2, 3, and 4) at operation 1132. The gaming device 200 then populates those expansion symbol positions with a determined symbol at operation 1134 and continues to operation 1108, resolving reels 2-6 and evaluating the outcome of the spin (e.g., with the additional expansion positions and their associated symbols being considered in the final evaluation).

If, at test 1140, the third bonus symbol (e.g., as shown and described in FIGS. 7A-7B) appears on reel 1, then the gaming device 200 replaces reel (e.g., reel 3) with a multiplier ladder. The gaming device 200 determines which multiplier from the multiplier ladder to award to the player and displays an animation to illustrate which multiplier the player has won at operation 1144. Then gaming device 200 then continues to operation 1108, resolving reels 2-6 (excluding reel 3, since the multiplier ladder acts as a single wild symbol for that reel) and evaluating the outcome of the spin (e.g., with the awarded multiplier from the multiplier ladder being factored into the final evaluation).

If, at test 1150, the fourth bonus symbol (e.g., as shown and described in FIG. 8) appears on reel 1, then the gaming device 200 replaces reels 2-6 with a special set of reels at operation 1152. Operation 1152 may include determining award values for one or more symbols on the special set of reels. At operation 1154, the gaming device 200 resolves the spin of the special set of reels (e.g., stopping the spinning reels based on an RNG result from the RNG engine 316). At operation 1156, the gaming device 220 identifies all of the award values resulting from the spin (e.g., credit awards) and any multipliers that appear on the spin result. At operation 1158, the gaming device 220 determines a total wagering outcome for the player at operation 1158 (e.g., multiplying the total credit awards by each of the identified multiplier(s)), awarding the player the total amount. The gaming device 200 then returns to operation 1102 to begin another round of play.

FIG. 11B illustrates operations for game play of the feature game activated during play of the base game in FIG. 11A. In the example embodiment, the gaming device 200 replaces the base game reels (e.g., reels 404) with a set of three feature game reels (e.g., reels 1006, 1008, 1010) at operation 1160. At operation 1162, the gaming device 200 initializes the prize position area 1004 with three empty prize positions, one above each of the three feature game reels. Further, each reel has an associated reel multiplier that is set to a base value of "×1". At operation 1164, the gaming device 200 creates credit stacks (e.g., one for each of the three reels). Each credit stack is initialized with seven credit prizes, each one corresponding to one of seven potential rounds of feature game play. The lowest two credit prizes and the highest credit prize in each credit stack are populated with a pre-determined credit award at operation 1166. At operation 1168, the gaming device 200 determines and populates credit prize values for the third through the sixth credit prizes in each credit stack (e.g., from a set of pre-determined potential credit prize values). At operation 1170, the gaming device 200 awards the player five free spins and begins feature game play for the first round (e.g., round=1).

At operation 1172, the gaming device 200 moves the lowest credit award from each credit stack into the prize position area above the associated reel. The gaming device 200 initiates and resolves a spin of the feature game reels (e.g., where each feature game reel shows either a winning symbol or a non-winning symbol/blank after the spin). At operation 1176, for each reel showing a winning symbol, the gaming device 200 awards the credit award in the prize position above that reel multiplied by the current reel multiplier for that reel. For example, if the credit award showing in the prize position above a winning reel showed 250 credits and the current reel multiplier for that reel was ×2, the player would be awarded 500 credits for that reel. At operation 1178, for each winning reel (e.g., each reel showing a winning symbol), the gaming device 200 advances the reel multiplier for that reel (e.g., per the pre-configured multiplier array). In some embodiments, advancing the reel multiplier may include incrementing the multiplier by 1. At operation 1180, for each non-winning reel (e.g., each reel not showing a winning symbol), the gaming device 200 resets that associated reel multiplier to "×1". If, at test 1182, the feature game is at or before the end of the fourth round of play (e.g., round <5), then the gaming device 200 increments the round counter and clears the prize positions at operation 1184 and begins the next round of play, returning to operation 1172. If, at test 1182, the feature game is at the end of the fifth round of play or later (e.g., round >=5), then the gaming device 200 checks to see if the seventh round is been concluded. More specifically, if, at test 1186, the feature game at the end of the seventh round (e.g., round=7), then the gaming device 200 concludes the feature game at operation 1188 and returns to the base game at operation 1102. If, at test 1186, the feature game is not at the end of the seventh round (e.g., round=5 or 6), then the gaming device 200 tests whether, during the fifth or sixth rounds, any winning reels were present in this latest spin. If the player achieved no winning symbols on the current round, then the gaming device 200 concludes the feature game at operation 1188. If, however, the player did achieve at least one winning symbol during the round (e.g., during rounds five or six), then the gaming device proceeds to another round of play, incrementing the round counter and clearing the prize positions at operation 1184 and beginning the next round of feature game play at operation 1172.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
   at least one display device;
   a player input interface configured to receive player input from a player; and
   a game controller configured to execute instructions stored in a tangible, non-transitory, computer-readable storage medium, which, when executed by the game controller, cause the game controller to at least:
   generate, based on a random number generator, at least one random number;
   query a lookup table of display symbols to be displayed in a grouped symbol position on the display device, at least one entry in the lookup table associated with a group of symbol positions comprising a plurality of single symbol positions and associated with a group weight, wherein the plurality of single symbol positions includes a population of partial symbols;
   select, based on the at least one random number, the at least one entry from the lookup table; and
   display in the grouped symbol position on the display device, based upon the at least one entry, at least one grouped symbol having a symbol height of at least two times the height of a single symbol position and comprising at least two of the partial symbols, the at least two of the partial symbols combining to display a complete symbol having a height at least two times the height of a single symbol position.

2. The electronic gaming machine according to claim 1, wherein the at least one entry includes sub-weights associated with the display symbols, and wherein the instructions further cause the game controller to display the display symbols within the grouped symbol position based upon the sub-weights.

3. The electronic gaming machine according to claim 1, wherein the grouped symbol position is divided into at least three partial symbol positions and the display symbols are respectively displayed in the at least three partial symbol positions.

4. The electronic gaming machine according to claim 2, wherein the instructions further cause the game controller to display the display symbol having the greatest weight at a top position within the grouped symbol position.

5. The electronic gaming machine according to claim 2, wherein the instructions further cause the game controller to display the at least two of the partial symbols vertically adjacent to one another based upon sub-weights associated with the at least two of the partial symbols.

6. The electronic gaming machine according to claim 1, wherein each entry in the lookup table includes a sufficient number of the at least two of the partial symbols to form the complete symbol.

7. The electronic gaming machine according to claim 1, wherein the instructions further cause the game controller to display on the display device, a plurality of game reels, each of the plurality of game reels displayed in a respective vertical column, the plurality of game reels comprising a first game reel type having a plurality of single symbol positions and a second game reel type including the grouped symbol position having a height at least 3 times the height of a single height symbol position.

8. The electronic gaming machine according to claim 1, wherein the instructions further cause the game controller to display on the display device an at least one extension position located above reels of a first game reel type.

9. The electronic gaming machine according to claim 8, wherein the instructions further cause the game controller to determine a game award based upon a combination of the extension position and the plurality of single symbol positions.

10. The electronic gaming machine according to claim 1, wherein the instructions further cause the game controller to display the grouped symbol while the single symbol positions continue to spin.

11. The electronic gaming machine according to claim 1, wherein the instructions further cause the game controller to display the grouped symbol and to display a multiplier ladder.

12. The electronic gaming machine according to claim 11, wherein the multiplier ladder comprises a plurality of different possible multipliers and the instructions further cause the game controller to select one of the plurality of different possible multipliers and highlight a selected multiplier.

13. The electronic gaming machine according to claim 12, wherein the instructions further cause the game controller to determine a payout based upon the multiplier ladder being evaluated as a single wild symbol.

14. The electronic gaming machine according to claim 12, wherein highlighting the selected multiplier is displayed as a change in size, shape or color of the selected multiplier.

15. A method of electronic gaming implemented on an electronic gaming machine, the electronic gaming machine comprising at least one processor, at least one display device, a player input interface, a game controller, and a credit input mechanism, the method comprising:
   generating, based on a random number generator, at least one random number;
   querying a lookup table of display symbols to display in a grouped symbol position on the display device, at least one entry of the lookup table is associated with a group of symbol positions comprising a plurality of single height symbols and associated with a group weight, wherein the plurality of single height symbols includes a population of partial symbols;
   selecting, based on the at least one random number, the at least one entry from the lookup table; and
   causing to be displayed in the grouped symbol position, based upon the at least one entry, at least one grouped symbol having a symbol height at least two times the height of a single height symbol and comprising at least two of the partial symbols, the at least two of the partial symbols combining to display a complete symbol having a height at least two times the height of the single height symbol.

16. The method according to claim 15, further comprising displaying the plurality of single height symbols based upon respective weights of the plurality of single height symbols.

17. The method according to claim 15, further comprising dividing the grouped symbol position into at least three partial symbol positions, and arranging the plurality of single height symbols respectively into the at least three partial symbol positions.

18. A non-transitory computer-readable storage media containing instructions, for execution by a processor, embodied thereon which, the instructions including commands for:
   performing a lookup on a lookup table of display symbols to be displayed in a grouped symbol position on a display device, at least one entry of the lookup table associated with a group of symbol positions comprising a plurality of single symbols and associated with a group weight, wherein the plurality of single symbols includes a population of partial symbols;
   selecting an entry from the lookup table; and
   determining a stop position based upon the at least one entry, wherein the stop position includes at least one grouped symbol having a height at least two times a height of the single symbols and comprising at least two of the partial symbols, the at least two of the partial symbols combining to display a complete symbol having a height at least two times the height of the single symbols.

19. The non-transitory computer-readable storage media according to claim 18, wherein the instructions further include commands for causing the single symbols to be positioned based upon respective weights of the plurality of single symbols.

20. The non-transitory computer-readable storage media according to claim 18, wherein the instructions further include commands for the single symbols having a greatest weight to be positioned at a top position of a plurality of positions within the grouped symbol position.

* * * * *